(12) United States Patent
Sharma et al.

(10) Patent No.: US 10,977,496 B2
(45) Date of Patent: *Apr. 13, 2021

(54) VIRTUALIZATION OF TANGIBLE INTERFACE OBJECTS

(71) Applicant: Tangible Play, Inc., Palo Alto, CA (US)

(72) Inventors: Pramod Kumar Sharma, San Jose, CA (US); Jerome Scholler, San Francisco, CA (US)

(73) Assignee: Tangible Play, Inc., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/675,059

(22) Filed: Nov. 5, 2019

(65) Prior Publication Data

US 2020/0218895 A1 Jul. 9, 2020

Related U.S. Application Data

(63) Continuation of application No. 16/125,544, filed on Sep. 7, 2018, now Pat. No. 10,515,274, which is a
(Continued)

(51) Int. Cl.
*G06K 9/00* (2006.01)
*A63F 13/42* (2014.01)
(Continued)

(52) U.S. Cl.
CPC ........ *G06K 9/00671* (2013.01); *A63F 13/213* (2014.09); *A63F 13/42* (2014.09);
(Continued)

(58) Field of Classification Search
CPC ............. G06T 2207/10016; G06T 7/20; G06T 7/2033; G06T 7/2053; G06T 19/00;
(Continued)

(56) References Cited

U.S. PATENT DOCUMENTS 6,175,954 B1 1/2001 Nelson et al.
7,181,363 B2 2/2007 Ratti et al.
(Continued)

FOREIGN PATENT DOCUMENTS

CN 102549527 A 7/2012
CN 102662430 A 9/2012
(Continued)

OTHER PUBLICATIONS

International Preliminary Report on Patentability received for PCT Patent Application No. PCT/US2015/032041, dated Dec. 1, 2016, 10 pages.
(Continued)

*Primary Examiner* — Todd Buttram
(74) *Attorney, Agent, or Firm* — Patent Law Works LLP

(57) ABSTRACT

An example system includes a stand configured to position a computing device proximate to a physical activity surface. The system further includes a video capture device, a detector, and an activity application. The video capture device is coupled for communication with the computing device and is adapted to capture a video stream that includes an activity scene of the physical activity surface and one or more interface objects physically interactable with by a user. The detector is executable to detect motion in the activity scene based on the processing and, responsive to detecting the motion, process the video stream to detect one or more interface objects included in the activity scene of the physical activity surface. The activity application is executable to present virtual information on a display of the computing device based on the one or more detected interface objects.

20 Claims, 21 Drawing Sheets

Related U.S. Application Data continuation of application No. 14/718,199, filed on May 21, 2015, now Pat. No. 10,083,356.

(60) Provisional application No. 62/001,057, filed on May 21, 2014.

(51) Int. Cl.

| | | |
|---|---|---|
| *A63F 13/213* | (2014.01) | |
| *G06T 7/149* | (2017.01) | |
| *G06F 3/0484* | (2013.01) | |
| *G06F 3/042* | (2006.01) | |
| *G06F 3/03* | (2006.01) | |
| *G06F 1/16* | (2006.01) | |
| *G06K 9/52* | (2006.01) | |
| *G06K 9/62* | (2006.01) | |

(52) U.S. Cl.
CPC .......... *G06F 1/1686* (2013.01); *G06F 3/0304* (2013.01); *G06F 3/0425* (2013.01); *G06F 3/04845* (2013.01); *G06K 9/00744* (2013.01); *G06T 7/149* (2017.01); *G06K 9/525* (2013.01); *G06K 9/6206* (2013.01)

(58) Field of Classification Search
CPC ... G06T 17/00; G06T 19/006; G06T 2215/16; H04N 5/145; H04N 5/272; H04N 2201/3245; G06K 9/00664–00704; G06F 3/0481; G06F 3/04817; G06F 9/4443; G06F 3/04847; G06F 11/3664; G06F 3/012; G06F 3/0304; G06F 3/011–015; A63F 13/10
See application file for complete search history.

(56) References Cited

U.S. PATENT DOCUMENTS

| | | | |
|---|---|---|---|
| 8,019,121 B2 | 9/2011 | Marks et al. | |
| 8,126,264 B2 | 2/2012 | Kaftory et al. | |
| 8,611,587 B2 | 12/2013 | Horovitz | |
| 9,350,951 B1* | 5/2016 | Rowe | A63B 24/0003 |
| 10,083,356 B2 | 9/2018 | Sharma et al. | |
| 10,515,274 B2 | 12/2019 | Sharma et al. | |
| 2004/0046736 A1 | 3/2004 | Pryor et al. | |
| 2006/0115113 A1* | 6/2006 | Lages | G01S 3/7864 382/103 |
| 2008/0249396 A1* | 10/2008 | Biglieri | A61B 5/103 600/411 |
| 2009/0273560 A1 | 11/2009 | Kalanithi et al. | |
| 2009/0276802 A1 | 11/2009 | Amento et al. | |
| 2010/0013656 A1* | 1/2010 | Brown | G08B 13/19613 340/686.6 |
| 2012/0244922 A1 | 9/2012 | Horovitz | |
| 2013/0051671 A1* | 2/2013 | Barton | G06T 7/12 382/173 |
| 2013/0113683 A1* | 5/2013 | Kitajima | G06F 3/1446 345/1.2 |
| 2013/0321447 A1 | 12/2013 | Horovitz et al. | |
| 2013/0336590 A1* | 12/2013 | Sentinelli | G06F 16/739 382/218 |
| 2014/0056495 A1* | 2/2014 | Janssens | A61B 6/583 382/128 |
| 2014/0118339 A1* | 5/2014 | Davies | G06T 15/10 345/419 |
| 2014/0125580 A1 | 5/2014 | Eun et al. | |
| 2014/0176530 A1* | 6/2014 | Pathre | G06T 19/20 345/419 |
| 2015/0220806 A1 | 8/2015 | Heller et al. | |
| 2015/0363003 A1 | 12/2015 | Henriz | |

FOREIGN PATENT DOCUMENTS

| | | |
|---|---|---|
| CN | 103678859 A | 3/2014 |
| DE | 112011102169 T5 | 4/2013 |
| EP | 1689172 A1 | 8/2006 |
| WO | 2006027627 A1 | 3/2006 |
| WO | 2015179689 A1 | 11/2015 |

OTHER PUBLICATIONS

International Written Opinion received for PCT Patent Application No. PCT/US2015/032041, dated Aug. 27, 2015, 8 pages.
Examination Report, GB1621482.7, dated Nov. 7, 2019 (3 pages).
Extended European Search Report, EP15796779.5, dated Dec. 7, 2017 (10 pages).
First Office Action, CN2015800368849, dated Dec. 28, 2018 (12 pages).
Second Office Action, CN2015800368849, dated Jul. 31, 2019 (3 pages).
International Search Report and Written Opinion for PCT/US2015/032041, dated Aug. 27, 2015 (14 pages).
Khandelwal et al., Teaching Table: Tangible Mentor for Pre-K Math Education, 1st International Conference on Tangible and Embedded Interaction, Feb. 15, 2007 (4 pages).
Lochtefeld et al., Little Projected Planet: An Augmented Reality Game for Camera Projector Phones, Jan. 1, 2010 (4 pages).
Mueller et al., A Physical Three-Way Interactive Game Based on Table Tennis, Interaction Design Group, Department of Information System, The University of Melbourne Australia, Dec. 3, 2007 (7 pages).
Pedersen, Grab and Touch: Empirical Research on Tangible Computing and Touch Interaction. University of Copenhagen, Denmark, Department of Computer Science, Faculty of Science, Nov. 2012 (75 pages).
Third Office Action, CN2015800368849, dated Feb. 6, 2020 (13 pages).
GB Search report dated Jul. 30, 2020 for GB Application No. 2008640.

* cited by examiner

VIRTUALIZATION OF TANGIBLE INTERFACE OBJECTS

BACKGROUND

The present disclosure relates to virtualizing tangible interface objects.

A tangible user interface is a physical environment that a user can physically interact with to manipulate digital information. While the tangible user interface has opened up a new range of possibilities for interacting with digital information, significant challenges remain when implementing such an interface. For instance, existing tangible user interfaces generally require expensive, high-quality sensors to digitize user interactions with this environment, which results in systems incorporating these tangible user interfaces being too expensive for most consumers. In other cases, the solutions are complex and/or cumbersome to use and require constant re-configuration and/or maintenance.

SUMMARY

According to one innovative aspect of the subject matter in this disclosure, a physical activity surface visualization system includes a stand, a video capture device, a detector, and an activity application. The stand is configured to position a computing device proximate to a physical activity surface, the computing device having one or more processors. The video capture device coupled for communication with the computing device. The video capture device is adapted to capture a video stream that includes an activity scene of the physical activity surface and one or more interface objects physically interactable with by a user. The detector is executable by the one or more processors to detect motion in the activity scene based on the processing and, responsive to detecting the motion, process the video stream to detect one or more interface objects included in the activity scene of the physical activity surface. The activity application is executable by the one or more processors to present virtual information on a display of the computing device based on the one or more detected interface objects.

In addition, various implementations may further optionally include one or more of the following features: that the detector is further executable by the one or more processors to determine attributes of each of the one or more interface objects, and the activity application is further executable by the one or more processors to execute one or more routines based on the attributes of each of the one or more interface objects to generate object-related information visualizing the one or more interface objects; that to present the virtual information on the computing device includes presenting the object-related information to visualize the one or more interface objects to the user; that the detector is further executable to process the video stream to detect the one or more interface objects included in the activity scene of the physical activity surface by receiving an image of the activity scene, processing the image for one or more contours of each of the one or more interface objects included in the activity scene, and constructing an object description for each of the one or more interface objects based on the one or more contours; that the activity application is further executable to present virtual information on the display of the computing device based on the one or more detected interface objects by generating a virtual representation of each of the one or more interface objects, and overlaying the virtual representation of each of the one or more interface objects with a corresponding virtual object in a virtual scene displayed on a computer display; a scoring module executable by the one or more processors, wherein the activity application is further executable to present virtual information on the one or more computing devices based on the one or more detected interface objects by cooperating with the scoring module to calculate differences between the virtual representation of each of the one or more interface objects with the corresponding virtual object and generate a score based on the calculated differences, and including a representation of the score based on the calculated differences in the virtual scene displayed on the computer display; that to calculate the differences between the virtual representation of each of the one or more interface objects with the corresponding virtual object includes calculating differences between contours of the virtual representation of each of the one or more interface objects with contours of the corresponding virtual object; that to calculate the differences between the virtual representation of each of the one or more interface objects with the corresponding virtual object further includes determining a shape of the corresponding virtual object, determining a number of pixels not filled within the shape, determining a number of pixels outside of the shape, determining a total number of pixels of the shape, and calculating a delta using the following formula: max(0, 1−(sum(pixels not filled)+sum(pixels outside shape))/sum (total shape pixels))*100; that to generate the score based on the calculated differences further includes executing a monotonic function to alter a perception of progression to the user in manipulating the one or more tangible interface objects in the activity scene.

Generally another innovative aspect of the subject matter described in this disclosure may be embodied in methods that include capturing, using a video capture device, a video stream that includes an activity scene of a physical activity surface and one or more interface objects physically interactable with by a user; processing, using one or more computing devices, the activity scene of the physical activity surface in the video stream for motion for a predetermined period of time; detecting, using the one or more computing devices, motion in the activity scene based on the processing; responsive to detecting the motion, processing, using the one or more computing devices, the video stream to detect one or more interface objects included in the activity scene of the physical activity surface; and presenting virtual information on a computer display based on the one or more detected interface objects.

Other implementations of one or more of these aspects include corresponding systems, apparatus, and computer programs, configured to perform the actions of the methods, encoded on computer storage devices. These and other implementations may each optionally include one or more of the following features.

For instance, the operations may further include determining, using the one or more computing devices, attributes of each of the one or more interface objects; executing, using the one or more computing devices, one or more routines based on the attributes of each of the one or more interface objects to generate object-related information visualizing the one or more interface objects; that the virtual information on the computer display includes presenting the object-related information on the computer display to visualize the one or more interface objects to the user; that processing the video stream to detect the one or more interface objects included in the activity scene of the physical activity surface further includes receiving an image of the activity scene, processing the image for one or more contours of each of the one or more interface objects included in the activity scene, and constructing an object description for each of the one or more interface objects based on the one or more contours; that presenting virtual information on the computer display based on the one or more detected interface objects further includes generating a virtual representation of each of the one or more interface objects, and overlaying the virtual representation of each of the one or more interface objects with a corresponding virtual object in a virtual scene displayed on the computer display; that presenting virtual information on the computer display based on the one or more detected interface objects further includes calculating differences between the virtual representation of each of the one or more interface objects with the corresponding virtual object, generating a score based on the calculated differences, and including a representation of the score based on the calculated differences in the virtual scene displayed on the computer display; that calculating the differences between the virtual representation of each of the one or more interface objects with the corresponding virtual object includes calculating differences between contours of the virtual representation of each of the one or more interface objects with contours of the corresponding virtual object; that calculating the differences between the virtual representation of each of the one or more interface objects with the corresponding virtual object further includes determining a shape of the corresponding virtual object, determining a number of pixels not filled within the shape, determining a number of pixels outside of the shape, determining a total number of pixels of the shape, and calculating a delta using the following formula: max(0,1−(sum(pixels not filled)+sum(pixels outside shape))/sum(total shape pixels))*100; and that generating the score based on the calculated differences further includes executing a monotonic function to alter a perception of progression to the user in manipulating the one or more tangible interface objects in the activity scene.

Generally another innovative aspect of the subject matter described in this disclosure may be embodied in methods that include capturing, using a video capture device, a video stream that includes an activity scene of a physical activity surface and one or more interface objects physically interactable with by a user; processing, using the one or more computing devices, the video stream to detect the one or more interface objects included in the activity scene of the physical activity surface; determining a user's progress relative to a pre-determined objective of an activity application executable on a computer device based on a state of the one or more interface objects within the activity scene; and updating a virtual scene rendered for display on a display device of the computing device with a visual indication of the user's progress. In a further example, determining a user's progress relative to a pre-determined objective of an activity application includes determining an effect of the one or more interface objects on a visual objective within the virtual scene and updating the virtual scene rendered for display on the display device includes updating the state of the visual objective based on the determined effect.

Numerous features and advantages of the technology presented herein are described throughout this disclosure. However, it should be understood, however, that the features and advantages described herein are not all-inclusive and many additional features and advantages are contemplated and fall within the scope of the present disclosure. Moreover, it should be understood that the language used in the present disclosure has been principally selected for readability and instructional purposes, and not to limit the scope of the subject matter disclosed herein.

BRIEF DESCRIPTION OF THE DRAWINGS

The disclosure is illustrated by way of example, and not by way of limitation in the figures of the accompanying drawings in which like reference numerals are used to refer to similar elements.

DETAILED DESCRIPTION

The technology described herein provides a platform for virtualizing a physical environment of tangible interface (TI) objects manipulatable by the user. In some implementations, the platform may augment a handheld computing device, such as a phone or tablet, with novel hardware accessories to make use of a built-in video camera on the computing device, and utilize novel computer vision algorithms to sense user interaction with the TI objects, although numerous other implementations and configurations of the platform are contemplated and described herein.

This technology yields numerous advantages including, but not limited to, providing a low-cost alternative for developing a nearly limitless range of applications that blend both physical and digital mediums by reusing existing hardware (e.g., camera) and leveraging novel lightweight detection and recognition algorithms, having low implementation costs, being compatible with existing computing device hardware, operating in real-time to provide for a rich, real-time virtual experience, processing numerous (e.g., >15, >25, >35, etc.) TI objects and/or TI object interactions simultaneously without overwhelming the computing device, recognizing TI objects with substantially perfect recall and precision (e.g., 99% and 99.5%, respectively), adapting to lighting changes and wear and tear of TI objects, providing a collaborative tangible experience between users in disparate locations, being intuitive to setup and use even for young users (e.g., 3+ years old), being natural and intuitive to use, assessing performance of user interaction of with TI objects relative to activity objectives, and requiring few or no constraints on the types of TI objects that can be processed. For instance, in some implementations, no specialized markers or symbols are required to be included on the TI objects in order for the platform to recognize the TI objects.

The TI objects used by the platform may be everyday objects used by and available to the user, specialized objects created for a specific purpose, a combination of the foregoing, etc. Non-limiting examples of TI objects include various consumer products, game pieces, clothing, toys, figurines, photographs, pre-configured cards, user-rendered drawings, pictures, portraits, etc., user-formable objects (moldable putty or clay), etc. The TI objects may have a substantially two-dimensional or three-dimensional shape.

Figure 1A:
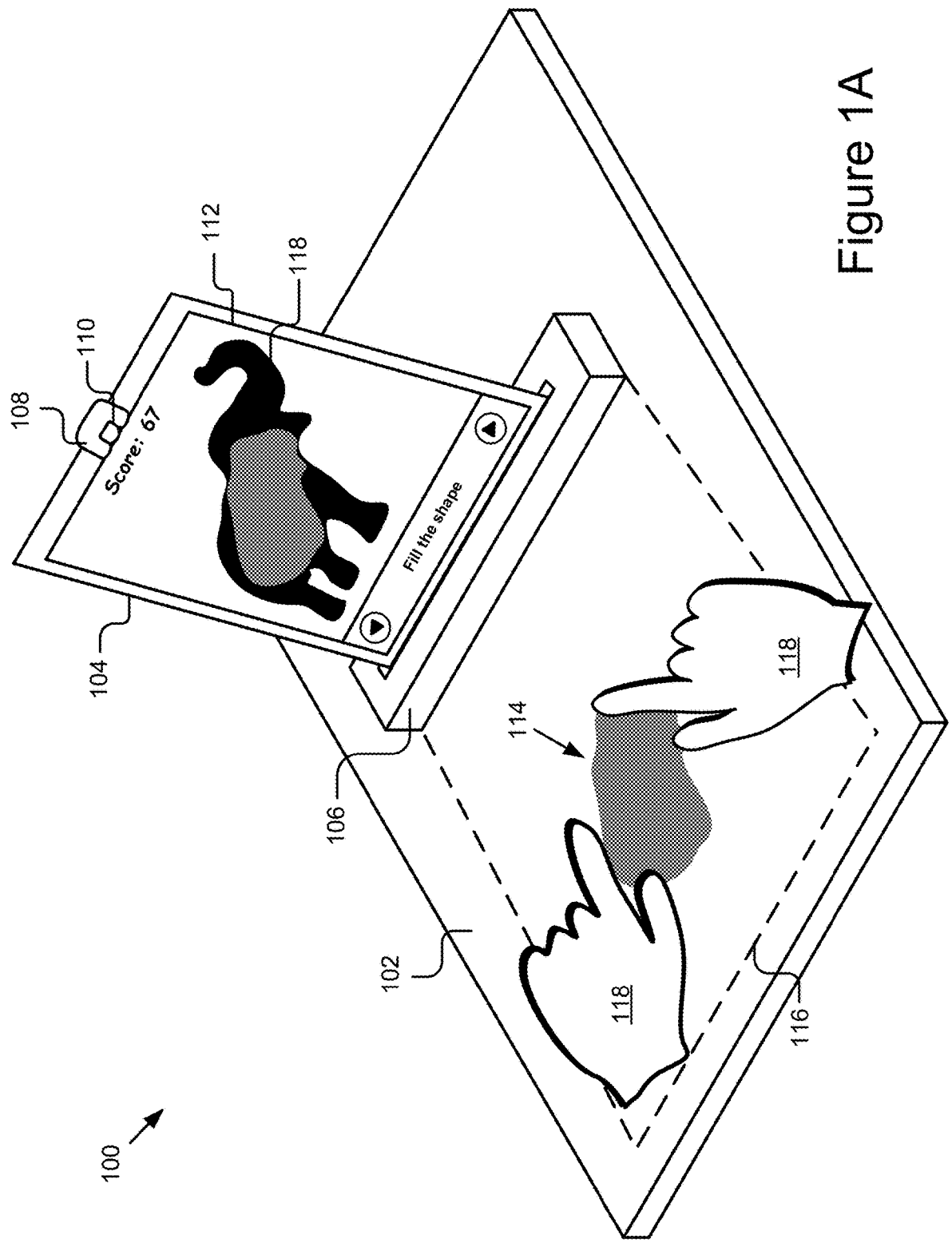
FIGS. 1A-1B are diagrams illustrating example configurations for virtualizing tangible interface objects.
Figure 1B:
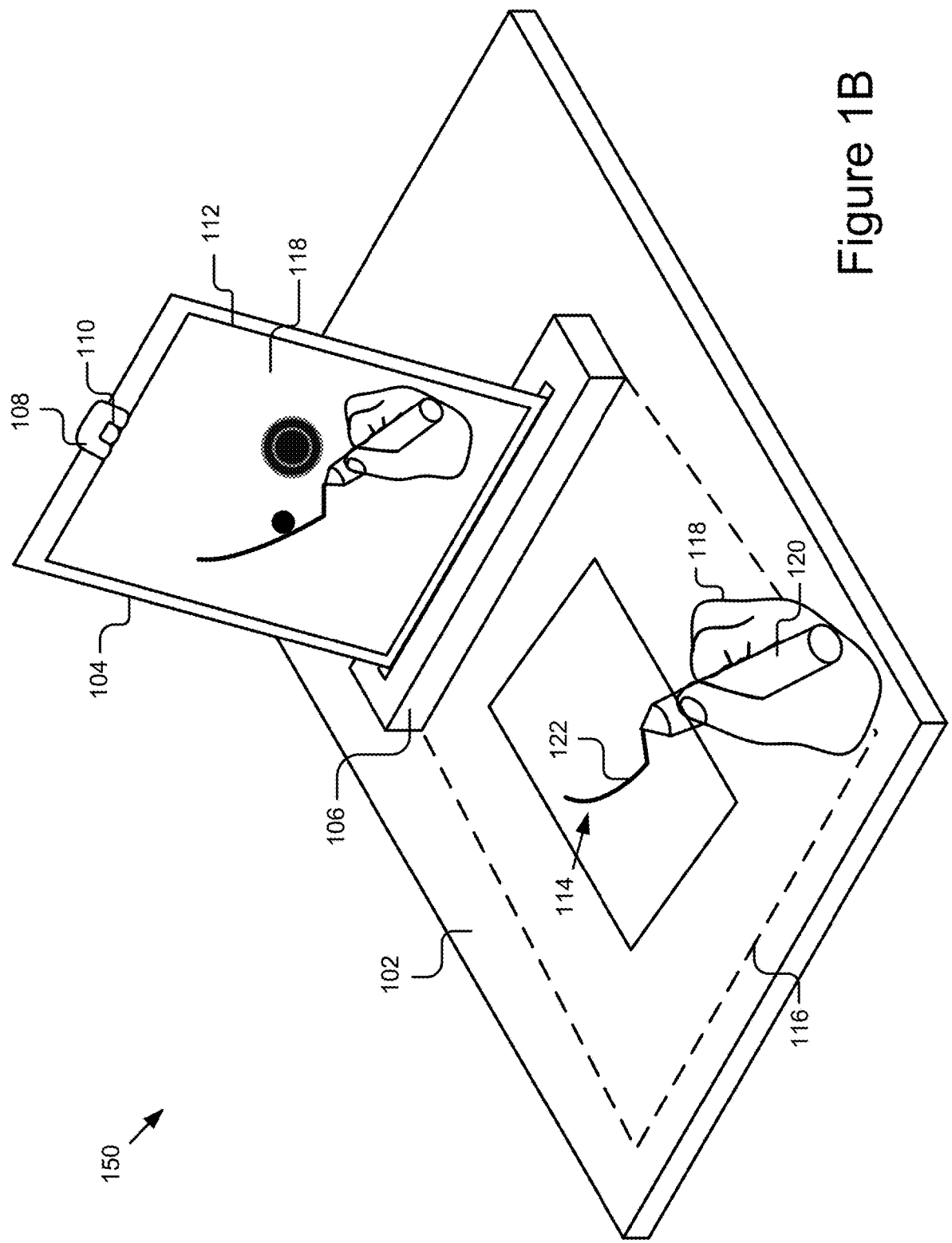

FIGS. 1A-1B are diagrams illustrating example configurations 100 and 150 for virtualizing the TI objects. As depicted, the configurations 100 and 150 include, at least in part, an activity surface 102 on which TI object(s) 114 can be placed, created, etc., and a computing device 104 that is equipped or otherwise coupled to a video capture device 110 configured to capture video of the activity surface 102 and that includes novel software and/or hardware capable of processing the video to detect and recognize the TI object(s) 114 and their manipulation by one or more users and provide for the virtualization and visualization of the TI objects and/or their manipulation (e.g., see virtualized TI object(s) 118). For instance, the TI object 114 in FIG. 1A is a piece of moldable putty being molded by the user's hands 118 and the TI object in FIG. 1B is line(s) being drawn by the user's hand 118 using an illustrating utensil 120 (e.g., a pencil, paintbrush, crayon, pen, etc.).

While the activity surface 102 is depicted as substantially horizontal in FIGS. 1A and 1B, it should be understood that the activity surface 102 can be vertical or positioned at any other angle suitable to the user for interaction. The activity surface 102 can have any color, pattern, texture, and topography. For instance, the activity surface 102 can be substantially flat or be disjointed/discontinuous in nature. Non-limiting examples of an activity surface 102 include a table, desk, counter, ground, a wall, a whiteboard, a chalkboard, a customized surface, etc.

The activity surface 102 may include a plain/natural surface or a surface preconfigured for certain activities. For instance, in the latter embodiment the activity surface 102 may constitute or include the board of a board game. The activity surface 102 could be integrated with the stand 106 or may be distinct from the stand 106 but placeable adjacent to the stand 106. The activity surface 102 could in some cases indicate to the user the boundaries of the activity surface 102 that is within the field of view of the video capture device 110. The activity surface 102 in some cases could include a pattern that coincides with an application operable on the computing device 104 (e.g., be configured for specific activities) or could be generic. For instance, the activity surface 102 could include a context (e.g., textual and/or graphical indicators) that signifies objectives for user to complete with the UI objects. In some cases, the activity surface 102 could be three-dimensional in nature and include various pre-configured objects for the user to interact with and/or that are configured for interaction with other TI objects. In some instances, the size of the interactive area on the activity surface 102 may be bounded by the field of view of the video capture device 110 and can be adapted by the adapter 108 and/or by adjusting the position of the video capture device 110. In additional examples, the activity surface 102 may be a light projection (e.g., pattern, context, shapes, etc.) projected onto the activity surface 102. Numerous further embodiments are also possible and contemplated.

The computing device 104 included in the example configurations 100, 150, and 180 may be situated on the surface 102 or otherwise proximate to the surface 102. The computing device 104 can provide the user(s) with a virtual portal for visualizing the TI objects being manipulated by the user. For example, the computing device 104 may be placed on a table in front of a user so the user can easily see the computing device 104 while interacting with different TI objects placed on the activity surface 102. Example computing devices 104 may include, but are not limited to, mobile phones (e.g., feature phones, smart phones, etc.), tablets, laptops, desktops, netbooks, TVs, set-top boxes, media streaming devices, portable media players, navigation devices, personal digital assistants, etc.

The computing device 104 includes or is otherwise coupled (e.g., via a wireless or wired connection) to a video capture device 110 (also referred to herein as a camera) for capturing a video stream of the activity surface 102. As depicted in FIGS. 1A and 1B, the video capture device 110 may be a front-facing camera that is equipped with an adapter 108 that adapts the field of view of the camera 110 to include, at least in part, the activity surface 102. For clarity, the portion 116 of the activity surface 102 captured by the video capture device 110 is also interchangeably referred to herein as the activity surface, physical activity surface, the activity scene, or physical activity scene.

As depicted in FIGS. 1A and 1B, the computing device 104 and/or the video capture device 110 may be positioned and/or supported by a stand 106. For instance, the stand 106 may position the display 112 of the video capture device 110 in a position that is optimal for viewing and interaction by the user who is simultaneously interacting with the physical environment (activity scene 116). The stand 106 may be configured to rest on the activity surface 102 and receive and sturdily hold the computing device 104 so the computing device 104 remains still during use.

In some implementations, the adapter 108 adapts a video capture device 110 (e.g., front-facing, rear-facing camera) of the computing device 104 to capture substantially only the activity scene 116, although numerous further implementations are also possible and contemplated. For instance, the camera adapter 108 can split the field of view of the front-facing camera into two or more scenes. By way of example, the video capture device 110 may capture an activity scene that includes the activity surface 102 situated in front of the video capture device 110 and may capture a user scene 126 that includes the user who may be situated substantially in front of the computing device 104. These scenes can be virtually rendered by a corresponding activity application executable by the computing device 104 in separate regions or the same regions of the display 112. In another example, the camera adapter 108 can redirect a rear-facing camera of the computing device (not shown) toward a front-side of the computing device 104 to capture the activity scene 116 of the activity surface 102 located in front of the computing device 104. In some implementations, the adapter 108 can define one or more sides of the scene being captured (e.g., top, left, right, with bottom open).

FIGS. 15-18 depict various examples of an adapter 108 and stand 106 for a computing device 104. As shown in these figures, the adapter 108 may include a slot 134 for retaining (e.g., receiving, securing, gripping, etc.) an edge of the computing device 104 so as to cover at least a portion of the camera 110. The adapter 108 may include at least one optical element 132 (e.g., a mirror) to direct the field of view of the camera 110 toward the activity surface 102. The computing device 104 may be placed in and received by a compatibly sized slot 136 formed in a top side of the stand 106. The slot 136 may extend at least partially downward into a main body of the stand 106 at angle so that when the computing device 104 is secured in the slot, it is angled back for convenient viewing and utilization by its user or users. The stand 106 may include a channel 130 formed perpendicular to and intersecting with the slot 136. The channel 130 may be configured to receive and secure the adapter 108 when not in use. For example, the adapter 108 may have a tapered shape that is compatible with and configured to be easily placeable in the channel 130 of the stand 106. In some instances, the channel 130 may magnetically secure the adapter 108 in place to prevent the adapter 108 from being easily jarred out of the channel 130. For example, the adapter 108 and the stand 106 may include compatible magnets that engage when the adapter 108 is aligned in the channel 130 as shown in FIG. 19. The stand 106 may be elongated along a horizontal axis to prevent the computing device 104 from tipping over when resting on a substantially horizontal activity surface (e.g., a table). The stand 106 may include channeling for a cable that plugs into the computing device 104. The cable may be configured to provide power to the computing device 104 and/or may serve as a communication link to other computing devices, such as a laptop or other personal computer.

In some implementations, the adapter 108 may include one or more optical elements, such as mirrors and/or lenses, to adapt the standard field of view of the video capture device 110. For instance, the adapter 108 may include one or more mirrors and lenses to redirect and/or modify the light being reflected from activity surface 102 into the video capture device 110. As an example, the adapter 108 may include a mirror angled to redirect the light reflected from the activity surface 102 in front of the computing device 104 into a front-facing camera of the computing device 104. As a further example, many wireless handheld devices include a front-facing camera with a fixed line of sight with respect to the display 112. The adapter 108 can be detachably connected to the device over the camera 110 to augment the line of sight of the camera 110 so it can capture the activity surface 102 (e.g., surface of a table).

In another example, the adapter 108 may include a series of optical elements (e.g., mirrors) that wrap light reflected off of the activity surface 102 located in front of the computing device 104 into a rear-facing camera of the computing device 104 so it can be captured. The adapter 108 could also adapt a portion of the field of view of the video capture device 110 (e.g., the front-facing camera) and leave a remaining portion of the field of view unaltered so that multiple scenes may be captured by the video capture device 110. The adapter 108 could also include optical element(s) that are configured to provide different effects, such as enabling the video capture device 110 to capture a greater portion of the activity surface 102. For example, the adapter 108 may include a convex mirror that provides a fisheye effect to capture a larger portion of the activity surface 102 than would otherwise be captureable by a standard configuration of the video capture device 110.

In some implementations, the video capture device is configured to include the stand 106 within its field of view. The stand 106 may serve as a reference point for performing geometric and/or image calibration of the camera 110. For instance, during calibration, a calibrator included in the detection engine 212 may calibrate the camera 110 (e.g., adjust the white balance, focus, exposure, etc.) of the camera 110 using the stand 106.

The video capture device 110 could, in some implementations, be an independent unit that is distinct from the computing device 104 and may be positionable to capture the activity surface 102 or may be adapted by the adapter 108 to capture the activity surface 102 as discussed above. In these implementations, the video capture device 110 may be communicatively coupled via a wired or wireless connection to the computing device 104 to provide it with the video stream being captured.

Figure 2:
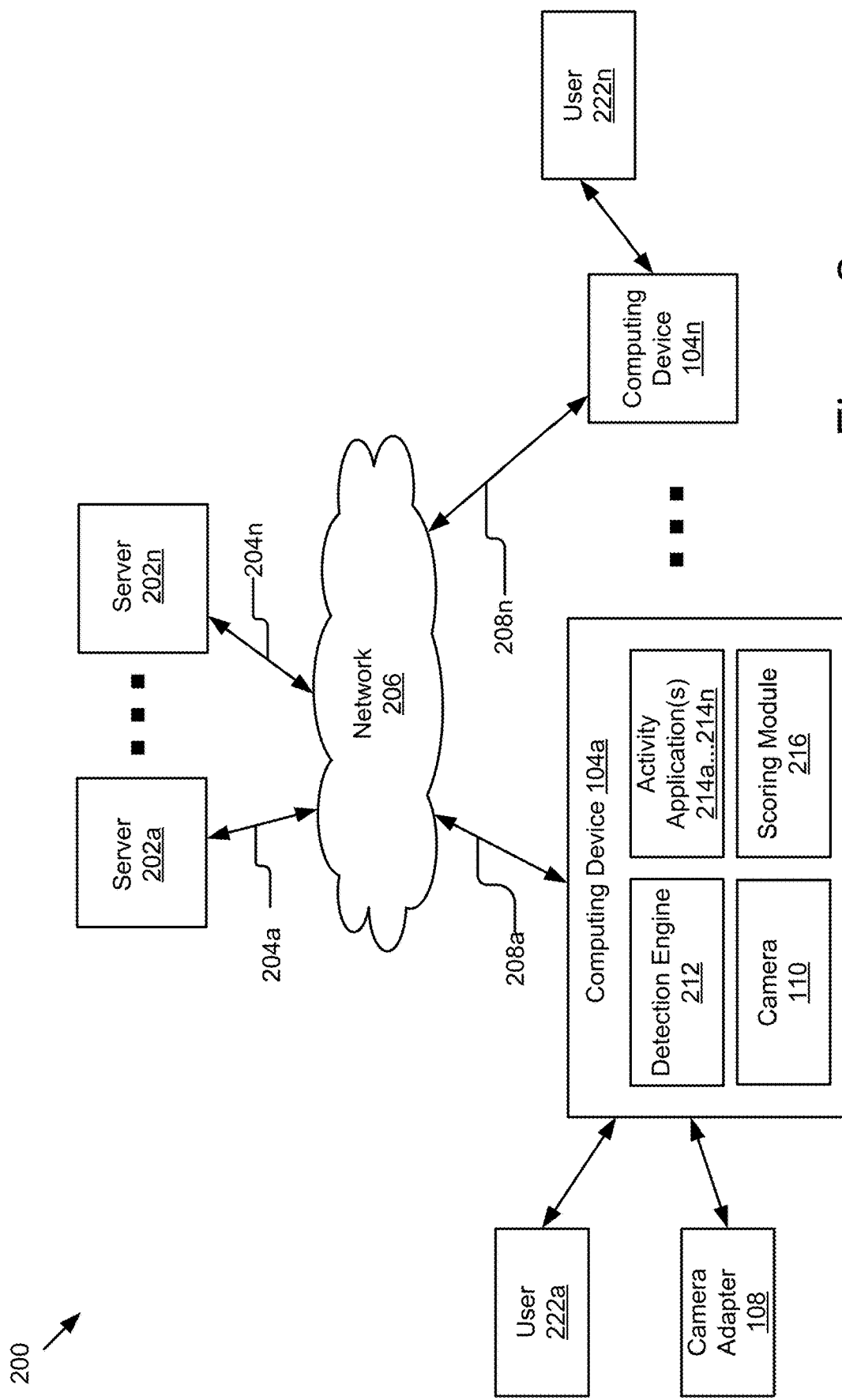
FIG. 2 is a block diagram illustrating an example computer system for virtualizing tangible interface objects.

FIG. 2 is a block diagram illustrating an example computer system 200 for virtualizing tangible interface objects. The illustrated system 200 includes computing devices 104a . . . 104n (also referred to individually and collectively as 104) and servers 202a . . . 202n (also referred to individually and collectively as 202), which are communicatively coupled via a network 206 for interaction with one another. For example, the computing devices 104a . . . 104n may be respectively coupled to the network 206 via signal lines 208a . . . 208n and may be accessed by users 222a . . . 222n (also referred to individually and collectively as 222). The servers 202a . . . 202n may be coupled to the network 206 via signal lines 204a . . . 204n, respectively. The use of the nomenclature "a" and "n" in the reference numbers indicates that any number of those elements having that nomenclature may be included in the system 200.

The network 206 may include any number of networks and/or network types. For example, the network 206 may include, but is not limited to, one or more local area networks (LANs), wide area networks (WANs) (e.g., the Internet), virtual private networks (VPNs), mobile (cellular) networks, wireless wide area network (WWANs), WiMAX® networks, Bluetooth® communication networks, peer-to-peer networks, other interconnected data paths across which multiple devices may communicate, various combinations thereof, etc.

The computing devices 104a . . . 104n (also referred to individually and collectively as 104) are computing devices having data processing and communication capabilities. For instance, a computing device 104 may include a processor (e.g., virtual, physical, etc.), a memory, a power source, a network interface, and/or other software and/or hardware components, such as front and/or rear facing cameras, display, graphics processor, wireless transceivers, keyboard, camera, sensors, firmware, operating systems, drivers, various physical connection interfaces (e.g., USB, HDMI, etc.). The computing devices 104a . . . 104n may couple to and communicate with one another and the other entities of the system 200 via the network 206 using a wireless and/or wired connection. While two or more computing devices 104 are depicted in FIG. 2, the system 200 may include any number of computing devices 104. In addition, the computing devices 104a . . . 104n may be the same or different types of computing devices.

As depicted in FIG. 2, one or more of the computing devices 104a . . . 104n may include a camera 110, a detection engine 212, a scoring module 216, and one or more activity applications 214a . . . 214n (also referred to individually and collectively as 214). One or more of the computing devices 104 and/or cameras 110 may also be equipped with an adapter 108 as discussed elsewhere herein. The detection engine 212 is capable of detecting and recognizing TI objects located in the activity scene 116 (on the activity surface 102 within field of view of camera 110). The detection engine 212 can detect the position and orientation of the objects in physical space, detect how the objects are being manipulated by the user, and cooperate with the activity application(s) 214 to provide users with a rich virtual experience incorporating those objects and their manipulation. In some implementations, the detection engine 212 processes video captured by a camera 110 to detect and recognize the TI object(s) and their attributes, generate events based on the TI objects and their attributes, and provide the events generated for the recognized objects to one or more activity applications 214.

The scoring module 216 can generate a score reflecting a user interaction with a tangible interface object relative to a pre-determined objective of an activity application 214. The score may be displayed to the user on the screen of the user's computing device 104 to reflect the user's progress and/or performance. The activity application(s) 214 can process the events received from the detection engine 212 and/or the score(s) generated by the scoring module 216 to provide the rich environment that blends the tangible, physical environment being manipulated by the user with information related to and/or complementing the TI objects. Additional structure and functionality of the computing devices 104 are described in further detail below with reference to at least FIG. 3.

The servers 202 may each include one or more computing devices having data processing, storing, and communication capabilities. For example, the servers 202 may include one or more hardware servers, server arrays, storage devices and/or systems, etc., and/or may be centralized or distributed/cloud-based. In some implementations, the servers 202 may include one or more virtual servers, which operate in a host server environment and access the physical hardware of the host server including, for example, a processor, memory, storage, network interfaces, etc., via an abstraction layer (e.g., a virtual machine manager).

The servers 202 may include software applications operable by one or more computer processors of the servers 202 to provide various computing functionalities, services, and/or resources, and to send data to and receive data from the computing devices 104. For example, the software applications may provide functionality for internet searching; social networking; web-based email; blogging; micro-blogging; photo management; video, music and multimedia hosting, distribution, and sharing; business services; news and media distribution; user account management; or any combination of the foregoing services. It should be understood that the servers 202 are not limited to providing the above-noted services and may include other network-accessible services.

In some implementations, a server 202 may include a search engine for retrieving results from a data store that match one or more search criteria. In some instances, the search criteria may include an image and the search engine may compare the image to images of products stored in its data store (not shown) to identify a product that matches the image. In a further example, the detection engine 212 and/or the storage 310 (e.g., see FIG. 3) may signal the search engine to provide information that matches an object and/or image that it has extracted from a video stream.

In some implementations, a server 200 may be a messaging server configured to receive message data including a video screen capture of the virtual scene and send that message data to the computing devices 104 of other users for consumption. For instance, the activity application 214 may receive video data from the camera 110 recording the actions of the user in performing action(s) as directed by the activity application 214 (e.g., molding an elephant out of putty in the physical activity scene 102). The user may perform the action(s) (e.g., mold the elephant) using the assistance provided by the activity application 214, which overlays a virtual representation of the user's activity (e.g., putty molding efforts) in the physical activity scene with visual objectives/requirements displayed by the activity application 214 (e.g., a predefined elephant shape) on the display 114 of the computing device 104. Once the user is finished attempting to satisfy the objectives/requirements (e.g., molding the putty into the shape of the elephant), the user may select an interface option (e.g., send a video button) which displays a form in which the user inputs the electronic address of the person the user wishes to share the video with. Upon instructing the activity application 214 to send the video, the activity application 214 may generate message data including the video data depicting the user's creation, and may transmit the message data to the messaging server using the electronic address input (e.g., selected, typed, etc.) by the user. Non-limiting examples of the types of messages that can be transmitted include email, SMS, chat, social network post, micro blog post, blog post, etc.

It should be understood that the system 200 illustrated in FIG. 2 is provided by way of example, and that a variety of different system environments and configurations are contemplated and are within the scope of the present disclosure. For instance, various functionality may be moved from a server to a client, or vice versa and some implementations may include additional or fewer computing devices, services, and/or networks, and may implement various functionality client or server-side. Further, various entities of the system 200 may be integrated into to a single computing device or system or additional computing devices or systems, etc.

Figure 3:
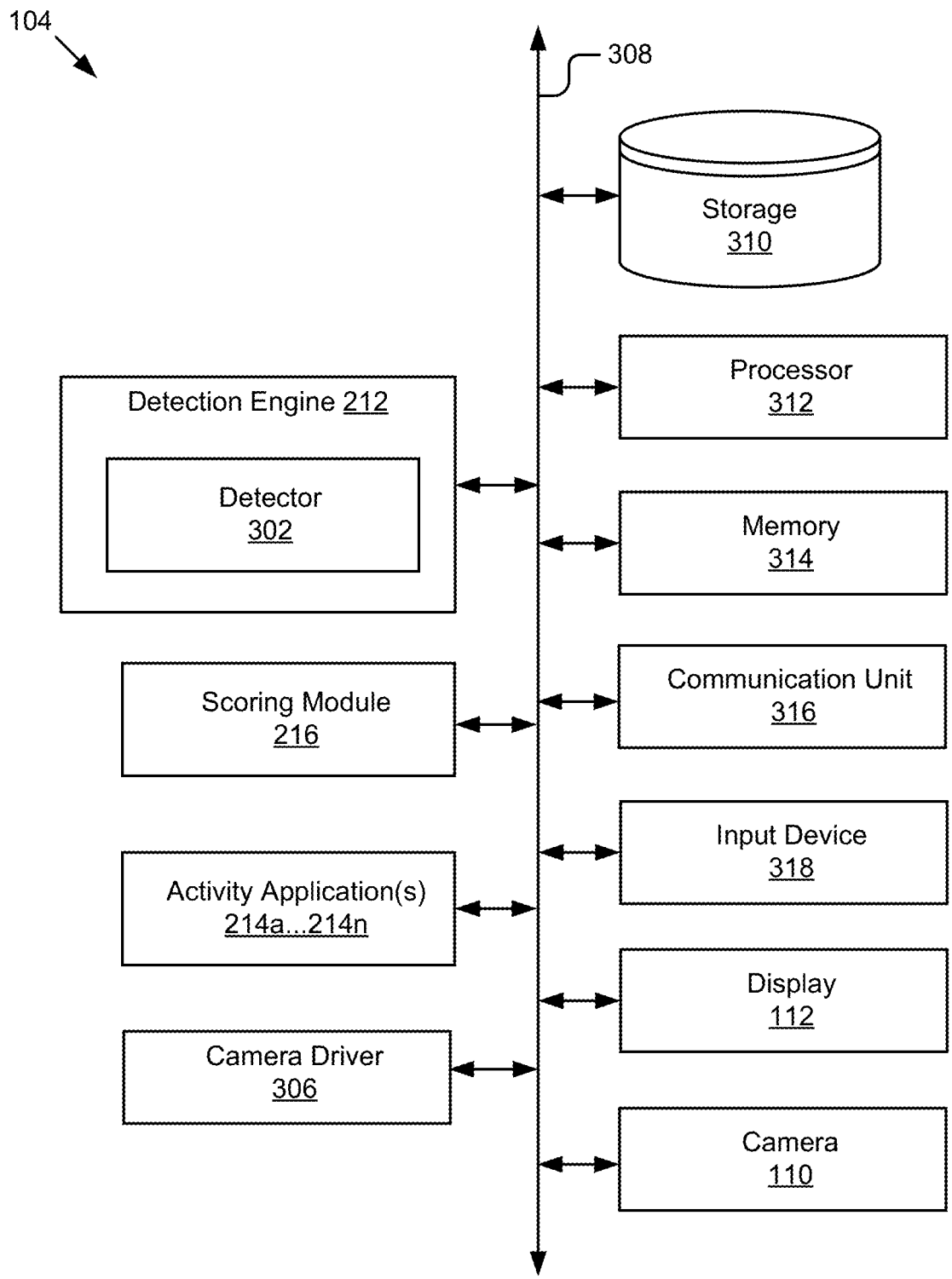
FIG. 3 is a block diagram illustrating an example computing device.

FIG. 3 is a block diagram of an example computing device 104. As depicted, the computing device 104 may include a processor 312, memory 314, communication unit 316, display 112, camera 110, and an input device 318, which are communicatively coupled by a communications bus 308. However, it should be understood that the computing device 104 is not limited to such and may also include other elements, including, for example, those discussed with reference to the computing devices 104 in FIGS. 1 and 2.

The processor 312 may execute software instructions by performing various input/output, logical, and/or mathematical operations. The processor 312 have various computing architectures to process data signals including, for example, a complex instruction set computer (CISC) architecture, a reduced instruction set computer (RISC) architecture, and/or an architecture implementing a combination of instruction sets. The processor 312 may be physical and/or virtual, and may include a single core or plurality of processing units and/or cores.

The memory 314 is a non-transitory computer-readable medium that is configured to store and provide access to data to the other components of the computing device 104. In some implementations, the memory 314 may store instructions and/or data that may be executed by the processor 312. For example, the memory 314 may store the detection engine 212, the activity applications 214a . . . 214n, and the camera driver 306. The memory 314 is also capable of storing other instructions and data, including, for example, an operating system, hardware drivers, other software applications, data, etc. The memory 314 may be coupled to the bus 308 for communication with the processor 312 and the other components of the computing device 104.

The communication unit 316 may include one or more interface devices (I/F) for wired and/or wireless connectivity with the network 206 and/or other devices. In some implementations, the communication unit 316 may include transceivers for sending and receiving wireless signals. For instance, the communication unit 316 may include radio transceivers for communication with the network 206 and for communication with nearby devices using close-proximity (e.g., Bluetooth®, NFC, etc.) connectivity. In some implementations, the communication unit 316 may include ports for wired connectivity with other devices. For example, the communication unit 316 may include a CAT-type (e.g., 5, 6, etc.) interface, Thunderbolt™ interface, FireWire™ interface, USB interface, etc.

The display 112 may display electronic images and data output by the computing device 104 for presentation to a user 222. The display 112 may include any conventional display device, monitor or screen, including, for example, an organic light-emitting diode (OLED) display, a liquid crystal display (LCD), etc. In some implementations, the display 112 may be a touch-screen display capable of receiving input from one or more fingers of a user 222. For example, the display 112 may be a capacitive touch-screen display capable of detecting and interpreting multiple points of contact with the display surface. In some implementations, the computing device 104 may include a graphics adapter (not shown) for rendering and outputting the images and data for presentation on display 112. The graphics adapter (not shown) may be a separate processing device including a separate processor and memory (not shown) or may be integrated with the processor 312 and memory 314.

The input device 318 may include any device for inputting information into the computing device 104. In some implementations, the input device 318 may include one or more peripheral devices. For example, the input device 318 may include a keyboard (e.g., a QWERTY keyboard), a pointing device (e.g., a mouse or touchpad), microphone, a camera, etc. In some implementations, the input device 318 may include a touch-screen display capable of receiving input from the one or more fingers of the user 222. For instance, the functionality of the input device 318 and the display 112 may be integrated, and a user 222 of the computing device 104 may interact with the computing device 104 by contacting a surface of the display 112 using one or more fingers. In this example, the user 222 could interact with an emulated (i.e., virtual or soft) keyboard displayed on the touch-screen display 112 by using fingers to contacting the display 112 in the keyboard regions.

The detection engine 212 may include a detector 302. The components 212 and 302, as well as the scoring module 216 and/or the activity application(s) 214 may be communicatively coupled by the bus 308 and/or the processor 312 to one another and/or the other components 306, 310, 314, 316, 318, 112, and/or 110 of the computing device 104. In some implementations, one or more of the components 212, 214, 216, and 302 are sets of instructions executable by the processor 312 to provide their functionality. In some implementations, one or more of the components 212, 214, 216, and 302 are stored in the memory 314 of the computing device 104 and are accessible and executable by the processor 312 to provide their functionality. In any of the foregoing implementations, these components 212, 214, 216, and 302 may be adapted for cooperation and communication with the processor 312 and other components of the computing device 104.

The detector 302 includes software and/or logic executable by the processor 312 for processing the video stream captured by the camera 110 to detect and identify TI object(s) included in the activity scene 116. In some implementations, the detector 302 may be couple to and receive the video stream from the camera 110, the camera driver 306, and/or the memory 314. In some implementations, the detector 302 may process the images of the video stream to determine positional information for the TI objects in the activity scene 116 (e.g., location and/or orientation of the TI objects in 2D or 3D space) and then analyze characteristics of the TI objects included in the video stream to determine the identities and/or additional attributes of the TI objects, as discussed in further detail below with reference to at least FIGS. 4-10.

In some implementations, the detector 302 may determine gestures associated with the TI objects that indicate how the TI objects have been manipulated over time by the user(s). For example and not limitation, the detector 302 may determine the following gestures for the TI objects:

Put: indicates TI object has appeared in activity scene 116;
Obscure: indicates TI object still present in activity scene 116 but has been partially or completely obscured (e.g., by a user's hand);
Remove: indicates TI object has disappeared from the activity scene 116;
Swap: indicates one TI object has been swapped in for another TI object (in approximately the same location);
Rotate: indicates TI object has been rotated (e.g., clockwise by 45, 90, 135, 180, 225, 270, 315 degrees, by any floating point value representing an angle, etc.);
Move: indicates object has been moved from one location to another in the activity scene 116;
Align: indicates two objects are somehow aligned (e.g., horizontally, vertically, diagonally, etc.); and
Pattern: indicates TI object centers form a pattern (e.g., a line, triangle, circle, square, rectangle, star, etc.).

The detector 302 may expose the TI objects and their attributes to the activity applications 214. For instance, the detector 302 may generate events for the TI objects based on the object-related information determined by the detector 302 for the TI objects, and may pass the events to the to one or more activity applications 214 for use thereby in generating rich virtual environments incorporating the TI objects and/or to the scoring module 216 to generate a score. An event for a given TI object detected and identified by the detector 302 may include one or more of the following: object ID, object confidence, size of object, shape of object, location of object (e.g., X, Y, Z), orientation of the object, whether object is obscured, how much of object is obscured, confidence object is obscured, gesture associated with object, etc.), although fewer or additional TI object attributes may also be used. The detector 302 may be coupled to the applications 214 (e.g., via the processor 312 and/or the bus 308) to provide the events to the applications 214.

In implementations where the video stream includes multiple scenes, such as scenes 116 and 126 in FIG. 1C, the detector 302 may process each of these scenes independently and simultaneously and discussed in further detail below with reference to at least FIGS. 5A and 5B.

The detector 302 may be coupled to a calibrator (not shown), an executable module included in the detection engine 212, to signal it to perform geometric and/or image calibration. In some implementations, the detector 302 may determine whether to signal the calibrator to calibrate the camera 110 based at least in part on whether objects and/or images are being successfully detected, as discussed in further detail below with reference to at least FIG. 6.

The detector 302 may be coupled to the storage 310 via the bus 308 store, retrieve, and otherwise manipulate data stored therein. For example, the detector 302 may query the storage 310 for data matching any TI objects that it has determined as present in the activity scene 116. In some implementations, the detector 302 may compute unique indexes for the objects it detects. The detector 302 may compute the indexes based on the visible and/or audible characteristics of the TI objects, such as images included on the TI objects, shapes of the TI objects, colors of the TI objects, textures of the TI objects, etc. In some implementations, each of the TI objects may include unique images and the detector 302 may perform image recognition on images to determine their identities. In these implementations, corresponding digital records for the TI objects may be indexed and stored in the storage 310, and the detector 302 may query the storage 310 for records matching the TI objects determined by the detector 302 as present in the activity scene 116.

The scoring module 216 includes software and/or logic executable by the processor 312 to generate a score reflecting the performance of the user interacting with the physical, tangible interface objects in the physical activity scene relative to the objectives/requirements (also simply referred to as objectives) of the virtual activity associated with the virtual activity scene (as generated by the applicable activity application 214). For example, to determine the score, in some embodiments, the scoring module 216 may overlay the virtual representation of the physical object (e.g., putty), as determined by the detector 302, with the predetermined shape (e.g., an elephant picture) and calculate how accurately the contours of the putty correspond to the contours of the predetermined shape.

Figure 12:
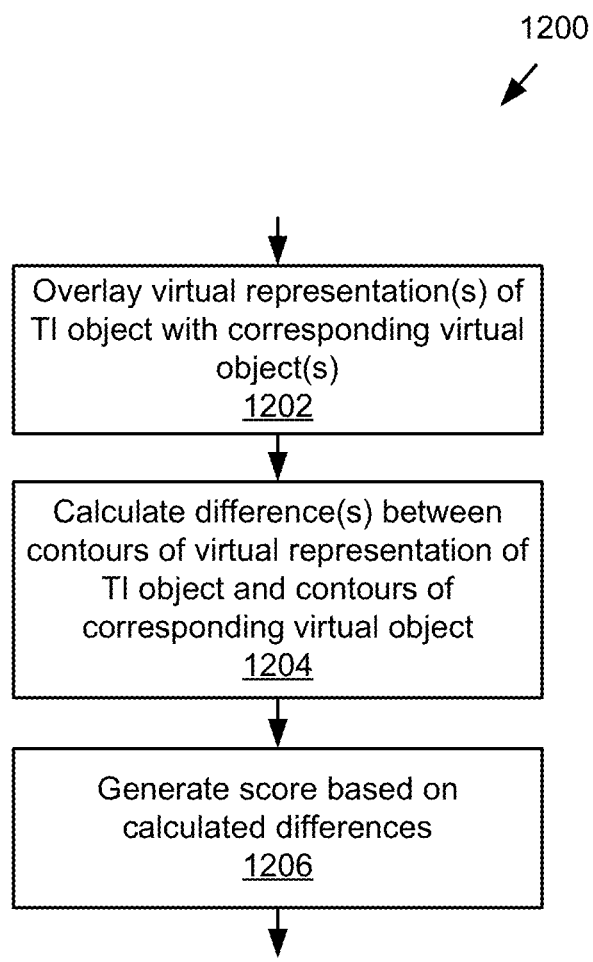
FIG. 12 is a flowchart of an example method for generating a score reflecting a user interaction with a tangible interface object relative to an objective of an activity application.

In some embodiments, the scoring module 216 may execute the method 1200 represented by the flowchart of FIG. 12 to generate a score based on state of the TI object(s) in the physical activity scene and the objective(s) of the virtual scene (e.g., gameplay) displayed on the device screen. In block 1202, the method 1200 overlays the virtual representation of a TI object with a corresponding virtual object. For example, the scoring module 216 overlays the contour data reflecting the contour(s) of the TI object with contours of a predetermined virtual object retrieved from computer memory (e.g., the memory 314 and/or the storage 310).

In block 1204, the method 1200 calculates difference(s) between contour(s) of the virtual representation of the TI object and the contour(s) of the corresponding virtual object, and then generates the score based on the calculated differences in block 1206. In some embodiments, the scoring module 216 computes the score by considering the delta between shape(s) being created by the user and the predetermined shape(s). The scoring module 216 may approximate the delta using pixels, for instance, using the following formula:

max(0,1−(sum(pixels not filled)+sum(pixels outside shape))/sum(total shape pixels))*100, where the scoring module 216 is configured to determine the shape of the corresponding virtual object, determining the number of pixels not filled within the shape, determine the number of pixels outside of the shape, and determining the total number of pixels of the shape based on the object description(s) and the virtual item data provided to or retrieved from data storage by the scoring module 216. For instance, the object reflecting the virtual item stored in the storage 310 may include the above-noted pixel information that the scoring module 216 and/or activity application 214 may retrieve for computing the score. Similarly, the detector 302 may determine and include the requisite pixel-related information relevant to the TI object(s) (attributes of those object(s) in the object description(s) of the TI object(s).

In some embodiments, the actual score (e.g., number) computed by the scoring module 216 may be altered by an increasing monotonic function such as: (100*sqrt(value/100)) to change the perception of progression, although other variations are also possible and contemplated.

While the scoring module 216 is depicted as a separate entity in FIG. 2, it should be understood that the detection engine 212, on or more activity applications 214, or another component may include and/or incorporate this module. For instance, each activity application may compute a score in a different manner based on gameplay and may include an instance of the scoring module 216 that is adapted to its objectives. In further examples, the scoring module 216 may be a function/module included in the detection engine 212 or as a separate component that can be called by the activity application(s) 214 and passed certain information, such as TI and/or virtual object identifiers and/or data (e.g., contour data, etc.). Further variations are also possible and contemplated.

The scoring module 216 may be coupled to the storage 310 and/or the memory 314 to store information (e.g., scores, processed data, etc.), retrieve information (e.g., prior scores, current scores, user profile data, contour data, pixel data, etc.), and delete information (e.g., prior scores, stored variables, etc.), etc.

The activity applications 214a . . . 214n include software and/or logic for receiving object-related events and running routines based thereon to generate a virtual environment for presentation to the user that incorporates, in real-time, the TI objects and their manipulation, and their relation to one another and the activity surface 102, in the physical activity scene 116. The activity applications 214a . . . 214n may be coupled to the detector 302 via the processor 312 and/or the bus 308 to receive the events and may be coupled to the scoring module 216 to receive score data reflecting a score. In some implementations, the activity applications 214a . . . 214 may process the events received from the detector 302 to determine the attributes of the object, may and may render corresponding information for display based on the attributes.

In some embodiments, an activity application 214 may receive contour data from the detector 302 and may provide the contour data to the scoring module 216 for it to use to compute a score, as discussed elsewhere herein. In some instance, the activity application 214 may determine objective(s) that state(s) of the TI object(s) and may update a virtual scene based on the state(s) of the TI object(s). For instance, the activity application 214 may update the virtual scene to visually reflect the user's progress in achieving the objectives(s). More particularly, the activity application 214 may in determining a user's progress relative to a predetermined objective determining an effect of TI object(s) on a visual objective within the virtual scene (e.g., by comparing positional and/or contextual information of the detected TI object(s) to the parameter(s) of the visual objective). The activity application 214 can then update the virtual scene rendered for display on the display device by updating the state of the visual objective based on the determined effect.

In a further example, the activity application 214 may cooperate with the scoring module 216 to determine the level to which the state(s) of the TI object(s) satisfy the objective(s) (e.g., as reflected by a score). As discussed elsewhere herein, an objective may be a predetermined shape that the shape of the TI object(s) should be manipulated by the user in physical space to mimic. In another example, an objective may be a target that the user, using TI objects in the physical scene, should reach.

In some further embodiments, the activity application 214 may use an object ID to retrieve a digital representation of the TI object from the storage 310, may use the object confidence to determine whether to even display information about the object (e.g., by comparing the object confidence to a predetermined threshold), may perform an action with the digital representation of the TI object based on the object's position and/or whether the object (or a nearby TI object) has been manipulated, e.g., moved, obscured, swapped, removed, newly added, etc.), may perform an action dependent on what other objects are aligned with and/or adjacent to a given object, etc.

The activity application 214 may enhance the virtual information/environment it generates using supplemental information determined based on the TI objects present in the activity scene 116. For example, an activity application 214 may develop a digital representation of a TI object with additional information (e.g., facts, statistics, news, video, photos, social network posts, microblogs, etc.) about the object, accessories for the object, visual enhancements or improvements to the object, sounds for the object, etc.

Non-limiting examples of the activity applications 214 may include art games, drawing games, video games, learning applications, assistive applications, storyboard applications, collaborative applications, productivity applications, etc. Various non-limiting examples of the virtual environments that can be rendered by the activity applications 214 are discussed below with reference to at least FIGS. 13A-14D.

The camera driver 306 includes software storable in the memory 314 and operable by the processor 312 to control/operate the camera 110. For example, the camera driver 306 is a software driver executable by the processor 312 for signaling the camera 110 to capture and provide a video stream and/or still image, etc. The camera driver 306 is capable of controlling various features of the camera 110 (e.g., flash, aperture, exposure, focal length, etc.). The camera driver 306 may be communicatively coupled to the camera 110 and the other components of the computing device 104 via the bus 308, and these components may interface with the camera driver 306 via the bus 308 to capture video and/or still images using the camera 110.

As discussed elsewhere herein, the camera 110 is a video capture device configured to capture video of at least the activity surface 102. The camera 110 may be coupled to the bus 308 for communication and interaction with the other components of the computing device 104. The camera 110 may include a lens for gathering and focusing light, a photo sensor including pixel regions for capturing the focused light and a processor for generating image data based on signals provided by the pixel regions. The photo sensor may be any type of photo sensor including a charge-coupled device (CCD), a complementary metal-oxide-semiconductor (CMOS) sensor, a hybrid CCD/CMOS device, etc. The camera 110 may also include any conventional features such as a flash, a zoom lens, etc. The camera 110 may include a microphone (not shown) for capturing sound or may be coupled to a microphone included in another component of the computing device 104 and/or coupled directly to the bus 308. In some embodiments, the processor of the camera 110 may be coupled via the bus 308 to store video and/or still image data in the memory 314 and/or provide the video and/or still image data to other components of the computing device 104, such as the detection engine 212 and/or activity applications 214.

The storage 310 is an information source for storing and providing access to stored data. In some implementations, the storage 310 may include an indexed set of records that correspond to virtual objects (e.g., graphical designs, etc.) that can be retrieved and displayed. The storage 310 may also store digital representations of the user-created TI objects (e.g., artwork, creations, etc.) made by the user in the physical scene using the functionality of a given activity application 214. In some implementations, records (e.g., image profiles) for various TI objects can be indexed using unique shapes, moment(s), histogram(s), etc. derived from the TI objects. These indexes may be computed using operations that are the same as or substantially similar to those discussed below with reference to at least FIGS. 7-8B.

In some implementations, the storage 310 may be included in the memory 314 or another storage device coupled to the bus 308. In some implementations, the storage 310 may be or included in a distributed data store, such as a cloud-based computing and/or data storage system. In some implementations, the storage 310 may include a database management system (DBMS), a file system, or other suitable storage system. For example, the DBMS could be a structured query language (SQL) or a NoSQL DBMS. In some cases, the storage 310 may store data in an object-based data store or multi-dimensional tables comprised of rows and columns, and may manipulate, i.e., insert, query, update, and/or delete, data entries stored in the verification data store 106 using programmatic operations (e.g., queries and statements or a similar database manipulation library). Additional characteristics, structure, acts, and functionality of the storage 310 is discussed elsewhere herein.

Figure 4:
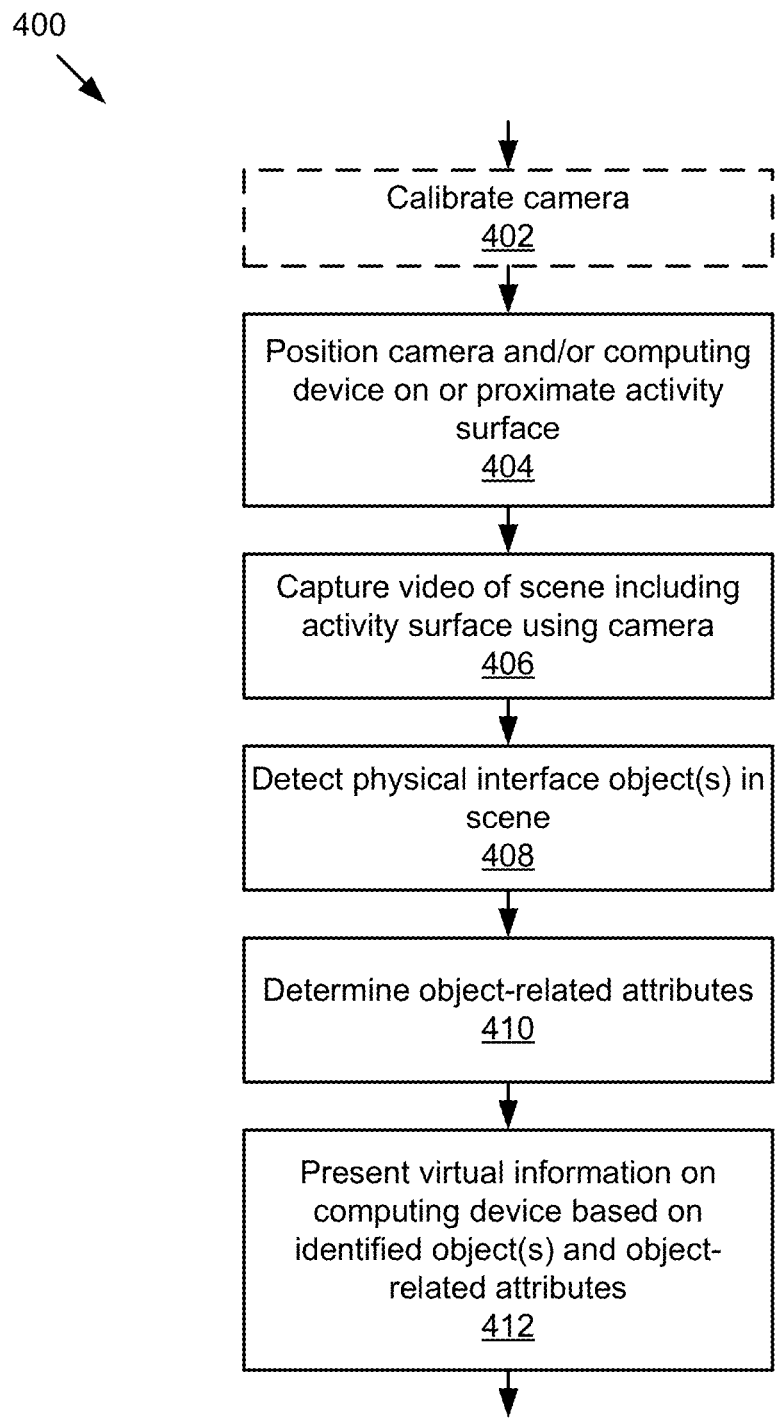
FIG. 4 is a flowchart of an example method for virtualizing tangible interface objects.

FIG. 4 is a flowchart of an example method 400 for virtualizing tangible interface objects. In block 402, a calibrator calibrates the camera 110. In some implementations, the calibrator performs geometric and/or image calibration to prepare the camera 110 for TI object detection and recognition. In block 404, the camera 110 and/or computing device 104 are then positioned on or proximate an activity surface and the video capture device (e.g., the camera 110) captures 406 a video stream that includes an activity scene of the activity surface and one or more interface objects that are physically interactable with by a user. In some implementations, the detector 302 can signal the camera 110 to capture the video stream (e.g., via the camera driver 306) and the camera 110 can provide the video stream to the detector 302 (e.g., directly, via the memory 314, etc.). As shown in FIGS. 1A and 1B, a computing device 104 that includes the camera 110 may be placed in a preconfigured stand 106 that positions the camera 110 to capture the activity scene 116 and positions the computing device 104 for viewing and/or interaction with by the user, although numerous further configurations are possible as described elsewhere herein. In some instances, the camera 110 may be adapted with the adapter 108 to optimally adapt the field of view of the camera 110 to capture a region of the activity surface 102 (e.g., table, wall, etc.) located in front of the computing device 104.

Next, the detector 302 processes the video stream to detect 408 one or more TI objects included in the activity scene 116 and determine 410 object attributes of the one or more TI objects that are detected. FIGS. 5A-9 describe various example operations that can be performed by the detector 302 to detect the TI objects and determine the object attributes, although additional and/or alternative operations are also possible and contemplated. The method 400 can then present 412 virtual information on the one or more computing devices 104 based on the one or more TI objects that are identified by the detector 302. For example, the detector 302 can pass events for the TI objects detected and identified by it to one or more activity applications 214 for visualization to the user in a virtual scene generated by it based on the events.

Figure 5A:
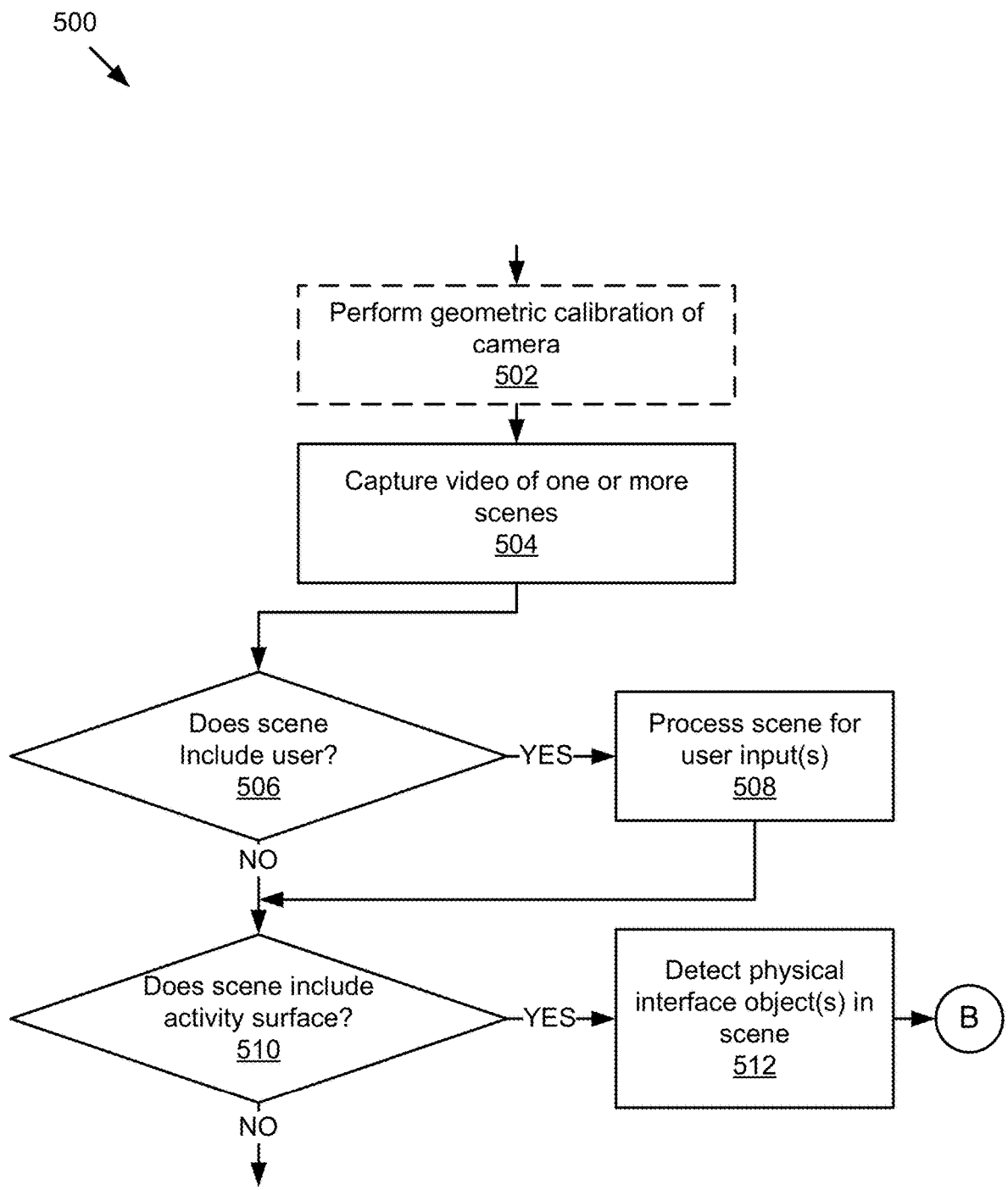
FIGS. 5A and 5B are flowcharts of a further example method for virtualizing tangible interface objects.
Figure 5B:
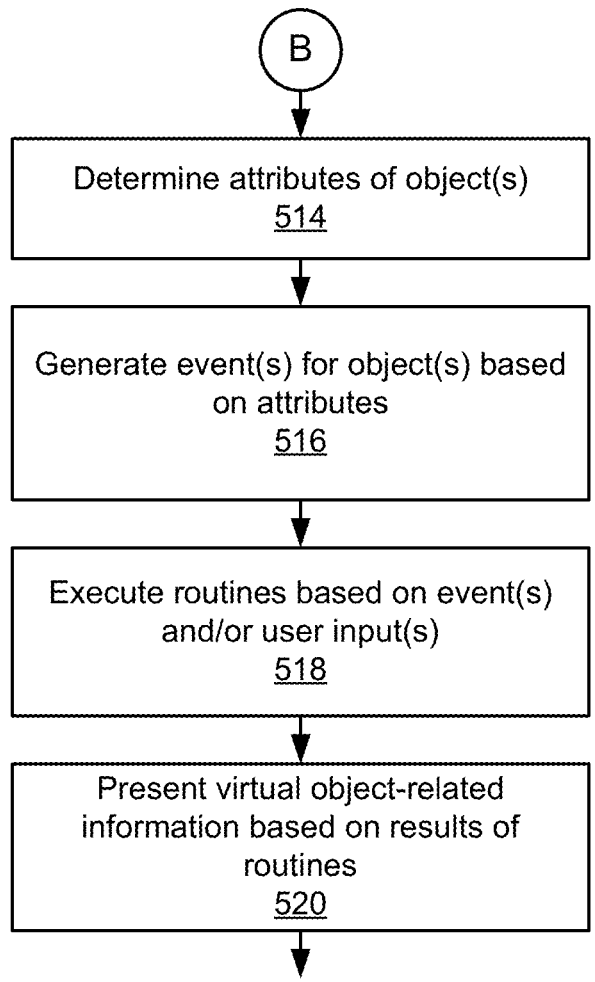

FIGS. 5A and 5B are flowcharts of a further example method 500 for virtualizing tangible interface objects. In block 502, a calibrator may initially perform geometric calibration of the video capture device (e.g., camera 110) and then the video capture device may, in block 504, capture video of one or more scenes. For example, as depicted in FIG. 1C, the camera 110 may capture the activity scene 116 and the user scene 126. In some instances, the field of view of the camera 110 may be split by the adapter 108 into multiple scenes, such as the activity scene 116 and the user scene 126. For instance, for a front facing camera 110, the adapter 108 may leave a portion of the field of view of the camera 110 unmodified to capture video of the users face and/or extremities (e.g., hands), and may redirect a portion of the field of view of the camera 110 downward to capture the activity service 102 using a reflective element, such as a mirror, although other configurations are also possible discussed elsewhere herein.

The detector 302 may then determine 506 whether the video received from the camera 110 contains a scene including a user (i.e., a user scene), and if so, can process 508 the user scene 126 for user inputs, such as speech, facial expressions, hand motions, body language, etc. For example, the detector 302 may process the facial regions and hand regions of a sequence of video images received from the camera 110 to determine whether the user is gesturing, and if so, may determine which gestures are being performed and pass those gestures along with any TI object events that it generates to one or more of the activity applications 214, as discussed elsewhere herein.

Additionally, the detector 302 may determine 510 whether the video received from the camera 110 contains a scene including the activity surface 102 (i.e., an activity scene 116), and if so, may proceed to detect 512 one or more TI objects included in the activity scene 116. If the video received from the camera 110 does not include the activity scene 116, the method 400 may return to block 502 to calibrate the camera 110, proceed to process the user inputs determined in block 508, may return an error prompt to the user indicating there is an issue with the configuration of the platform, may terminate or wait, etc.

In block 514, the detector 302 may determine attributes for the detected TI objects(s), and in block 516 may generate corresponding event(s) for the TI object(s) based on their attributes. As described elsewhere herein, attributes that the detector 302 can determine may include but are not limited to, a contour-based object description for each TI object, a confidence for the inferred shape of each TI object, whether the object is obscured, and by how much, a confidence for the obscurity determination, gestures associated with the TI object(s), etc. One or more activity applications 214 may receive the object event(s) and/or any user inputs determined by the detector 302, and may execute 518 routines based thereon. Based on the results produced by the routines, the one or more activity applications 214 may present virtual object-related information in block 520, such as a rich virtual environment presenting digital information reflecting activity objectives, digital representations of the TI object(s), supplemental and environmental graphical and text interface elements, etc., to the user(s), as discussed elsewhere herein.

Figure 6:
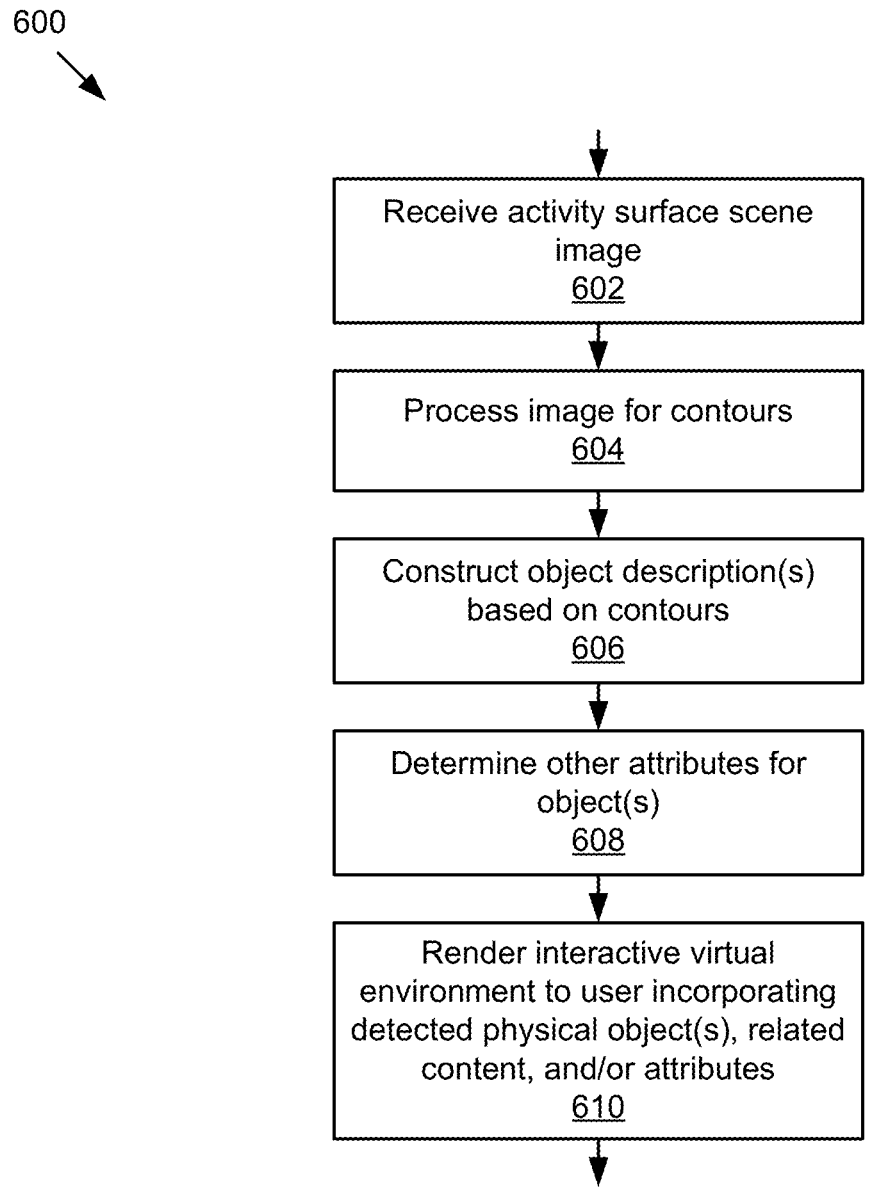
FIG. 6 is a flowchart of an example method for tangible interface object detection.

FIG. 6 is a flowchart of an example method 600 for tangible interface object detection. In the method 600, the detector 302 may receive 602 an image of the activity scene 116, process 604 the image for the contour(s) of each TI object included in the activity scene 116, construct 606 an object description for each TI object based on the contour(s), and in some cases determine 608 other attributes of the object(s), such as a color(s) of the TI object, shape inferred from the contours/object description, aesthetic properties of the of the TI object (e.g., texture of the object, graphical and/or textual elements adorning the object, etc.), a confidence in the detection of the TI object, etc. FIGS. 5A-9 describes various further example operations that can be performed by the detector 302 to detect the TI object(s), although additional and/or alternative operations are also possible and contemplated.

One or more of the activity applications 214 may use the object descriptions, the other attributes of the TI object(s), etc. (e.g., based on the events received from the detector 302) to render 610 an interactive virtual environment to the user that incorporates digital representations of the TI object(s), content related to the TI object(s), and/or the environmental and/or positional attributes of the TI object(s), as described elsewhere herein.

In some implementations, an activity application 214 may specify the shape(s) of the TI object(s) (either directly or in the storage 310) that the detector 302 should look for when performing the object detection and identification, and the detector 302 may compare the specified shape(s) to those it infers from the video data to determine what the TI object(s) are. In further implementations, the detector 302 may infer the shape(s) of the TI object(s) and query a search engine operable by the server 202 or another information source (e.g., the storage 310) to determine what the TI object(s) are. Other variations are also possible and contemplated.

Figure 7:
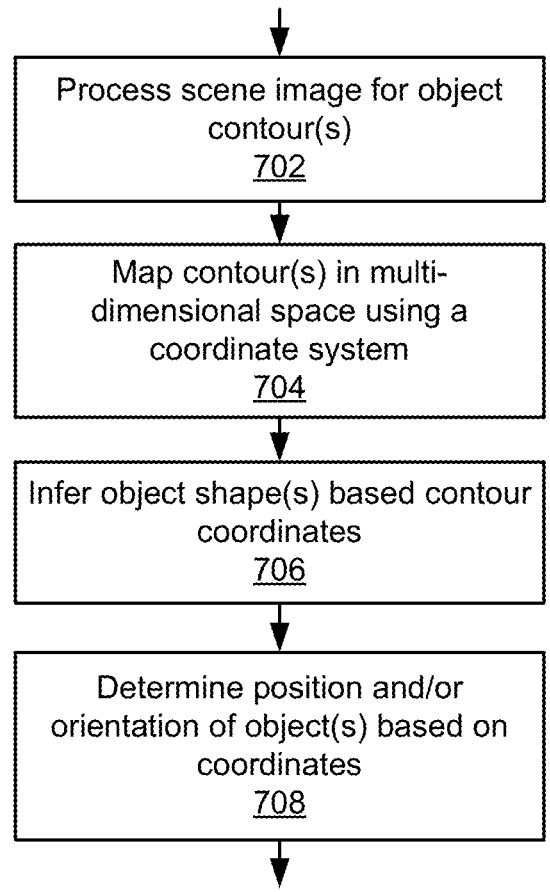
FIG. 7 is a flowchart of a further example method for tangible interface object detection.

FIG. 7 is a flowchart of a further example method 700 for TI object detection. In block 702, the detector 302 may process the video image of the activity scene 116 for contour(s) of each TI object included in the activity scene 116 and construct 704 a description for each TI object by mapping the contour(s) associated with each of the TI objects using a coordinate system. The detector 302 may then infer 706 the object shape for each TI object based on the coordinates of the contour(s) associated with each TI object, and determine 708 the position and/or orientation of the TI object(s) based on the coordinates of those TI object(s). For example, the detector 302 may use the coordinates of the contours of the objects to determine the position and/or orientation of the objects. In some cases, the detector 302 may compare the coordinates with a known point of reference (e.g., the stand 106, positional information associated with the TI objects stored in the storage 310, etc.) to determine the position and/or orientation of the objects.

Figure 8:
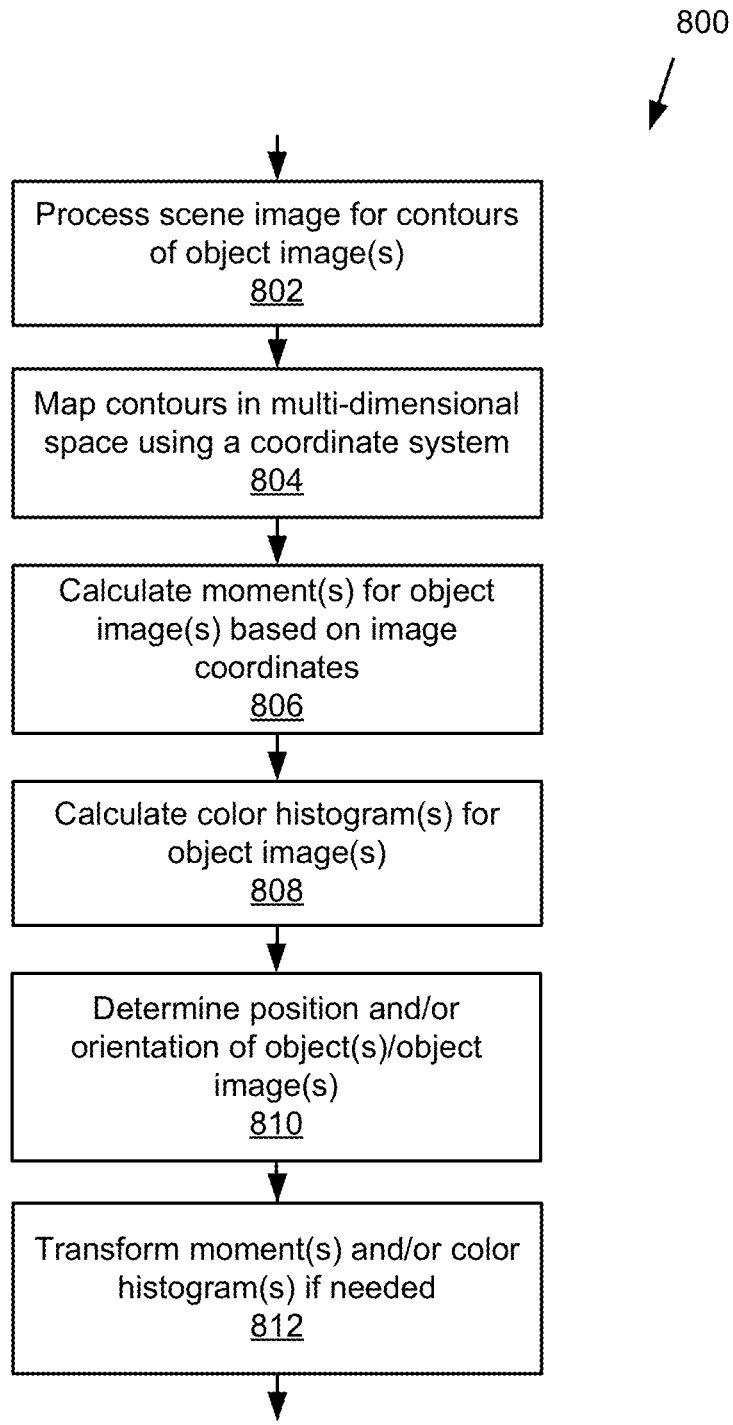
FIG. 8 is a flowchart of a further example method for tangible interface object detection.

FIG. 8 is a flowchart of a further example method 800 for TI object detection. In block 802, the detector 302 may process the video image of the activity scene 116 for contour(s) of image(s) contained on the TI object(s) and in block 804 may construct description(s) for the object image(s) by mapping the contour(s) associated with the image(s) using a coordinate system. The coordinate system may be two or three dimensional in nature and may be configured to reflect the dimensions (scaled or actual) of the activity scene 116, and thus the position of the TI object(s) when mapped by the detector 302. Next, the detector 302 may calculate 806 moment(s) for the object image(s) based on the mapped coordinates associated with the image(s). Example moments that can be calculated by the detector 302 may include area moments, perimeter moments, centroid moments, etc. These moments may be calculated based on the areas, perimeters, etc., of the items depicted by object images of the TI object(s). As a further example, the detector 302 may use the coordinates of the contours for the items it processes from the object images to determine perimeters or areas for those items, and may then compute various moments as unique identifiers for the images using the perimeters or areas. In some instances, the detector 302 may manipulate various parameters of the camera to adjust the video images being captured (e.g., contrast, exposure, white balance, levels, etc.) to enhance the contours of the items depicted by the object images.

Alternatively or in addition to block 806, the detector 302 may calculate 808 color histogram(s) for the object image(s) as unique identifiers for the image(s). The color histogram(s) may be computed based on the entire image or one or more sections thereof. For instance, the detector 302 may divide the image contained on a given TI object using a grid and may compute color histogram(s) for using the image data from one or more quadrants of the grid. As a further example, the grid may be a 4×4 grid that overlays the image containing 16 quadrants and the detector 302 may compute three color histograms using image data from the $1^{st}$, $5^{th}$ and $6^{th}$ quadrants (e.g., counted left to right, top to bottom), respectively. This is advantageous as each image may be indexed using different attributes extracted from different regions of the object image, thus allowing the platform to index more than one attribute.

The detector 302 may determine 810 positional information for the TI object(s), such as location and/or orientation of the TI object(s) within the activity scene 116 based on the object and/or image coordinates. The detector 302 may also determine 812 whether to transform the moments and/or histograms computed in blocks 606 and/or 808. In some instances, the moments and or histograms may be transformed based on the position of the TI object(s) within the activity scene 116 (e.g., relative to a point of reference, such as the stand 106).

Figure 9:
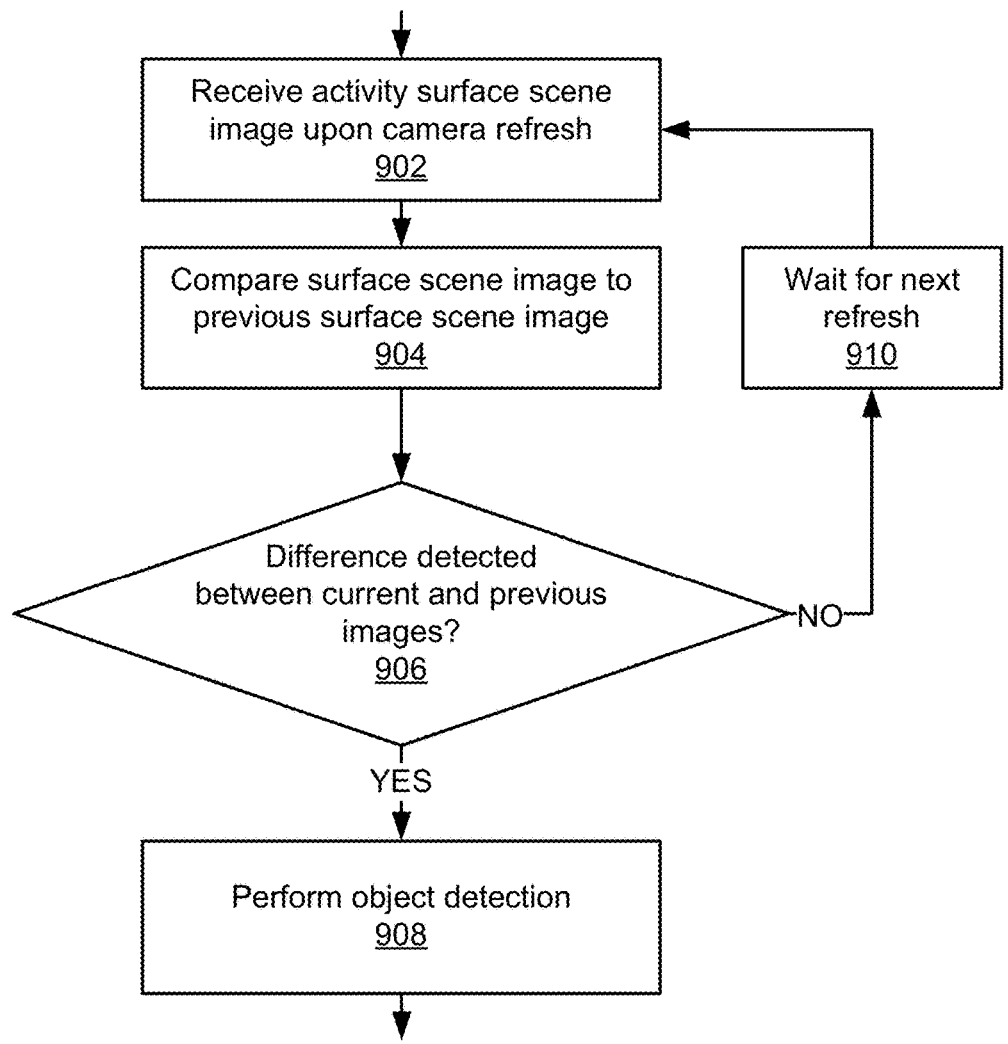
FIG. 9 is a flowchart of an example method for detecting changes in the state of an activity surface.

FIG. 9 is a flowchart of an example method 900 for detecting changes in the state of an activity surface.

In block 902, the detector 302 may receive a video image frame of the activity scene 116. Next, the detector 301 may compare 904 the activity scene image to a previously received image frame of the activity scene 116, determine 906 whether a substantial difference exists between the image frame of the activity scene 116 and the previously received image frame of the activity scene 116, and proceed in block 908 to process the video stream to detect the one or more interface objects included in the activity scene 116 if the substantial difference is determined to exist. If in block 906, a substantial difference is not detected between the current and previous states of the activity scene 116, the method 900 may wait 910 for the next image frame and then repeat the operations in at least blocks 902, 904, and 906.

By using the method 900, the detection engine 212 may wait for the next video image that actually contains a significant enough change to justify processing the image for TI object(s). As a further example, during each cycle, the detector 302 may compare a previous and subsequent video image to determine if there are any significant changes and may refrain from processing the most recent image unless the changes satisfy a predetermined threshold. The method 900 is advantageous because it can eliminate unnecessary detection and recognition processing by the platform and thereby avoid bogging down/adversely affecting the performance of the computing device 104.

Figure 10:
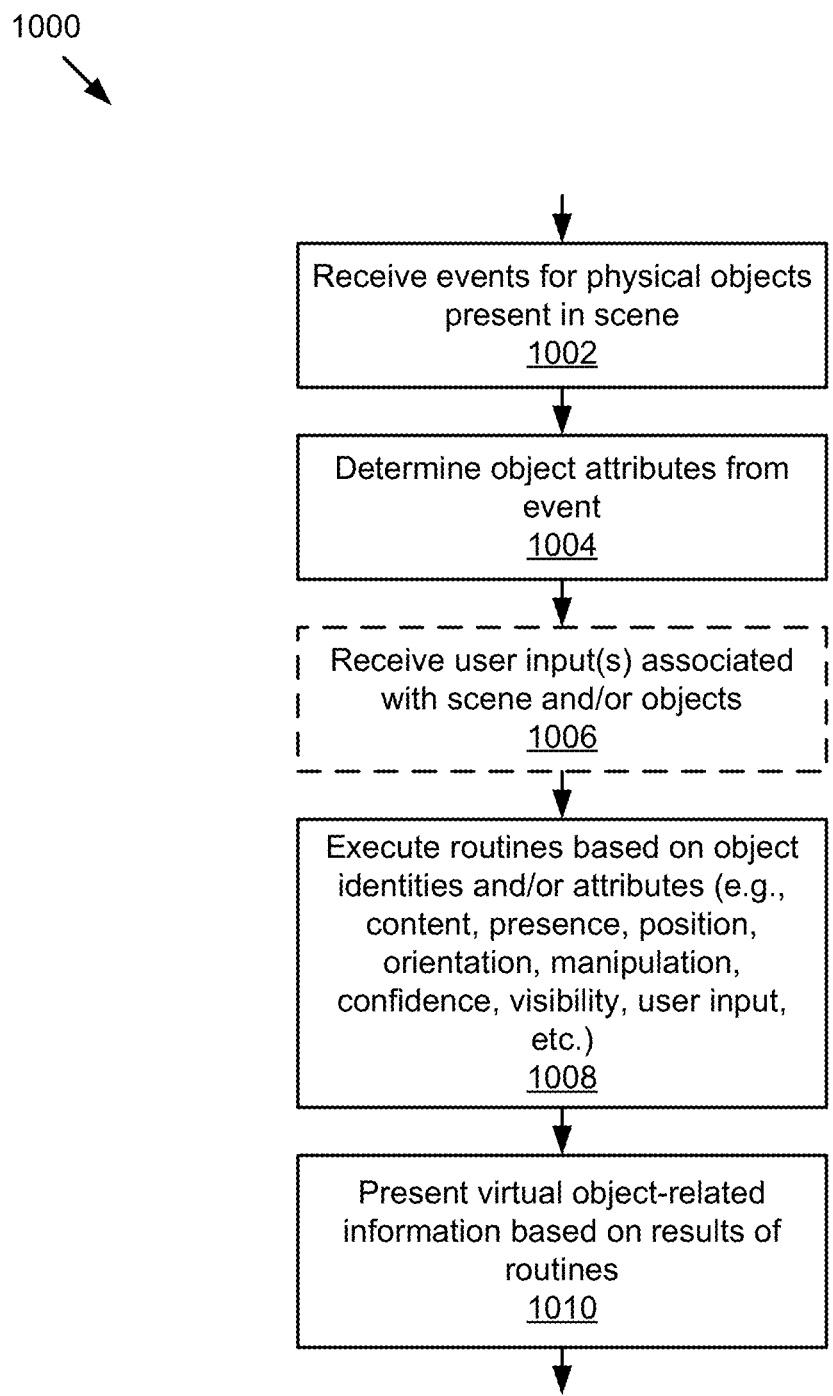
FIG. 10 is a flowchart of an example method for processing and displaying virtual object-related information based on the interface objects identified.

FIG. 10 is a flowchart of an example method 1000 for processing and displaying virtual object-related information based on the TI object(s) identified. In block 1002, an activity application 214 may receive event(s) for the TI object(s) determined by the detector 302 as present in the activity scene 116. Based on information included in the one or more events, the activity application 214 may determine 1004 attributes of the TI object(s) associated with the event. The attributes may include object contour(s), color(s), shape(s), ornamental feature(s) (e.g., labels, icons, text, etc.), unique object identifiers (IDs), etc.

In block 1006, the method 1000 may receive one or more input(s) associated with the activity scene 116 and/or TI object(s), such as gestures determined from the event(s) provided by the detector 302, gestures derived from information included from event(s) received over time, user input(s) detected from a user scene by the detector 302, etc., user input(s) received from the user via the input device 318 of the computing device 104, etc.

Based on the identities and attributes of the TI object(s), the activity application 214 may then execute 1008 one or more routines to generate object-related information visualizing the one or more interface objects and may present 1010 the object-related information to the user, as discussed elsewhere herein.

For instance, a given activity application 214 may generate an interface combining a virtual representation (e.g., video image) of the TI object in the physical activity scene with a reference image of a certain object and display the interface on the display to show an overlay of the IT object with the reference image (e.g., video of the putty creation reflecting the user's interpretation of the target shape with the target image depicting the animal shape).

In another example, a given activity application 214 may generate an interface incorporating generated virtual representation(s) (e.g., line drawing(s)) of the TI object(s) in the physical activity scene 116 into the virtual scene (e.g., activity/gameplay). For instance, the activity application 214 may determine interactions between the virtual TI object representation(s) and other virtual objects in the interface, and generate a graphical user interface that visually illustrates the interactions. An example embodiment of one such environment is depicted in FIGS. 14A-14D, in which the activity application 214 is a ball video game and where the activity application 214 includes algorithms directing the movement of one or more virtual balls in a video game interface on the device screen 112. In the game, the user can use any tangible, physical objects (TI objects) (e.g., drawings, toys, body parts, etc.) to redirect/deflect/impede the movement of the virtual balls toward certain objective(s) (e.g., red target(s)) depicted in the interface. In this case, the TI object(s) in the physical activity scene 116, which can be ordinary everyday objects that are electrically disconnected from (not electrically communicatively wiredly or wirelessly to) the computing device 104), can advantageously be used/act as virtual controllers in the ball video game.

In either example, to quantify the user's performance, the activity application 214 may signal the scoring module 216 to compute a score assessing the user's performance in performing various tasks in the physical activity scene relative to the objective(s) depicted in the virtual activity scene rendered by the activity application 214. The activity application 214 may receive the score from the scoring module 215 and/or computer storage and incorporate the score into the virtual activity scene, as discussed elsewhere herein.

Figure 11:
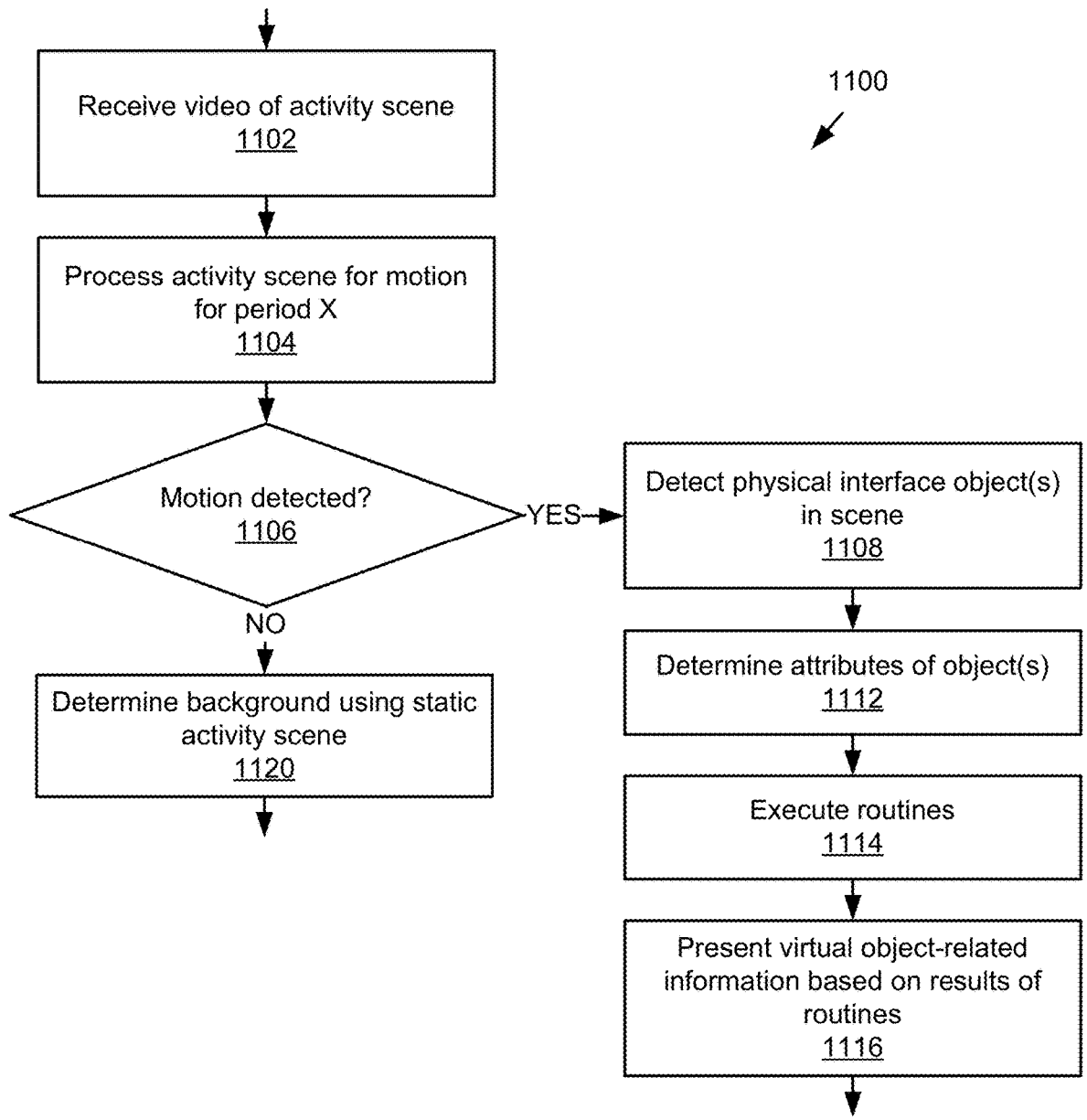
FIG. 11 is a flowchart of an example method for separating a background from tangible interface objects.

FIG. 11 is a flowchart of an example method 1100 for separating a background from tangible interface objects. In blocks 1102 and 1104, the detector 302 receives video of the activity scene and processes it for motion for a predetermined period X. X can be any amount of time, such as 1 or more seconds, a fraction of a second, etc. In some embodiments, to process the scene for motion, the detector 302 may compare subsequent frames of the video to one another to identify differences between them. In some embodiments, to reduce computational resources, the detector 302 may compare frames using a predetermined time periodicity instead of comparing every frame of the video. In some embodiments, the detector 302 may ignore inconsequential changes in the activity scene captured by the video, such as shadows, lighting effects, etc.

In block 1106, if no motion has been detected for period X, the method 1100 may determine a background using the (static) activity scene. In some embodiments, the detector 302 may store an image of the background (the static video scene) and use it when detecting physical interface objects to improve precision.

If motion has been detected in block 1106, the method 1100 may proceed to detect 1108 the physical interface object(s) in the scene using the background determined in block 1120 (if available). In some embodiments, the method 1100 may ignore the objects in the background and instead consider the objects not present in the background. This is advantageous as it can improve the speed and accuracy of the object detection operations, additional details of which are discussed in further detail elsewhere herein.

In some embodiments, if a background has not yet been determined in block 1120, the method 1100 may prompt the user to not disturb the activity scene and return to block 1104 to begin the background determination process again, may forgo the background determination process and instead detect prominent TI objects in the activity scene and allow a user to select from those objects or may estimate which object(s) are the object(s) of interest, etc.

In blocks 1112, 1114, and 1116, the method 1100 may determine attributes of the object(s), execute routines based on object(s) (and/or related events and/or inputs), and present virtual object-related information based on the results of the routines, as discussed in further detail elsewhere herein. Naturally, the method 1100 or portions thereof may be iterated again as needed (e.g., to update the background, continually process the activity scene for object(s), etc.).

It should be understood that the each of the methods 400-1200 are in many respects compatible with and in some cases expansions one or more of the other methods, and that further methods based on the combination of various aspects of these methods are contemplated and within the scope of the present disclosure.

In addition, the methods 400-1200 are advantageous in a number of respects including, but not limited to, providing fast and accurate TI object detection and recognition, providing the user with a real-time, virtualized experience that blends the user's physical interaction with the TI objects and activity surface 102 and rich, visual and computational enhancements that would otherwise be inaccessible to the user, and adding a meaningful tangible aspect to what can otherwise be a tactile-less, largely sterile digital experience.

FIGS. 13A-14D are examples of virtualized scenes on a computing device 104 generated based on physical scenes interacted with by users on a physical activity surface. These figures depict a series of incremental changes to a physical activity scene 116 on a physical activity surface, which are replicated within the context of two example gaming environments produced by corresponding activity applications 214 on a computing device 104.

Figure 13A:
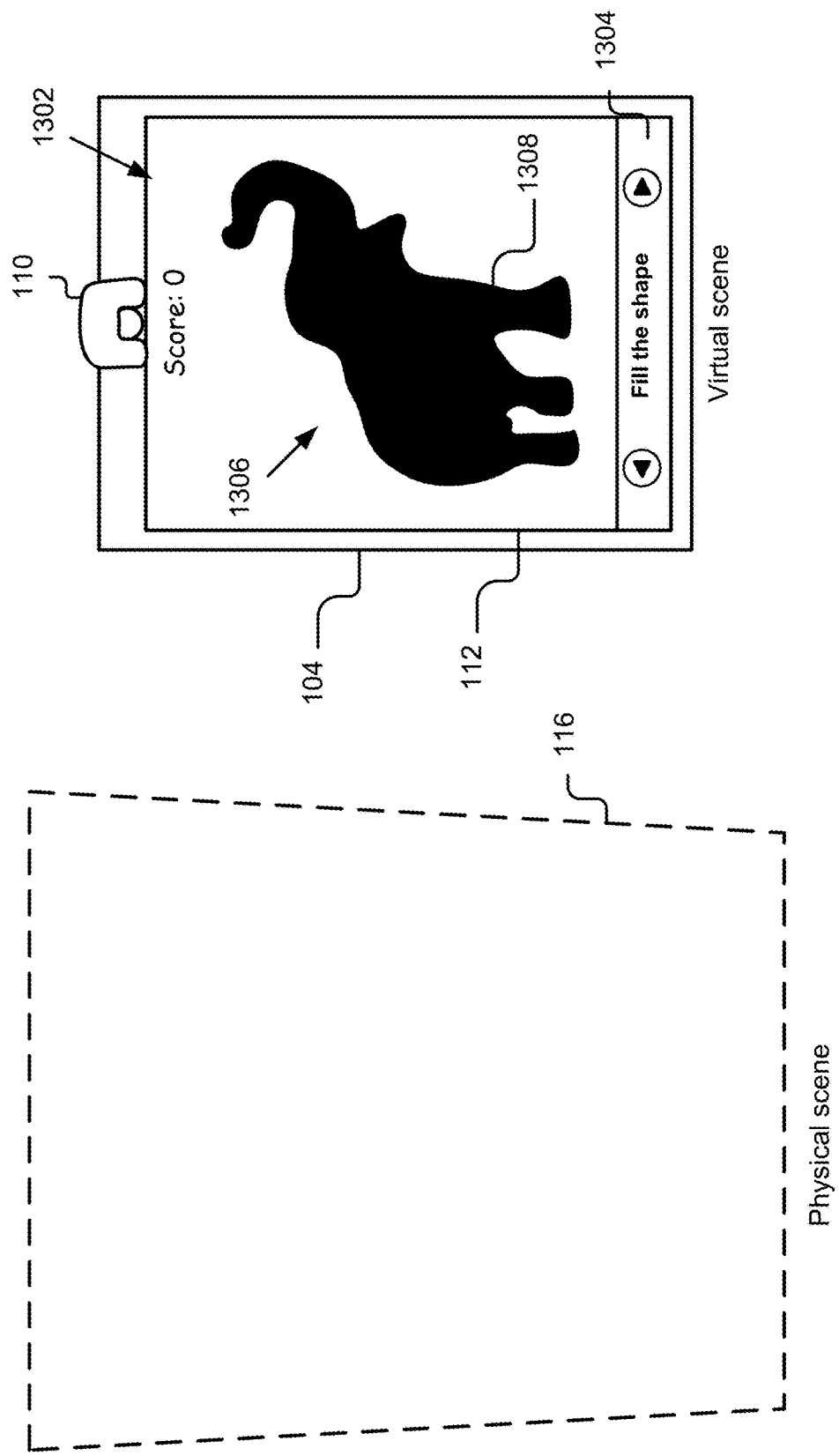
FIGS. 13A-14D are examples of virtualized scenes on a computing device generated based on physical scenes created by users on a physical activity surface.
Figure 13B:
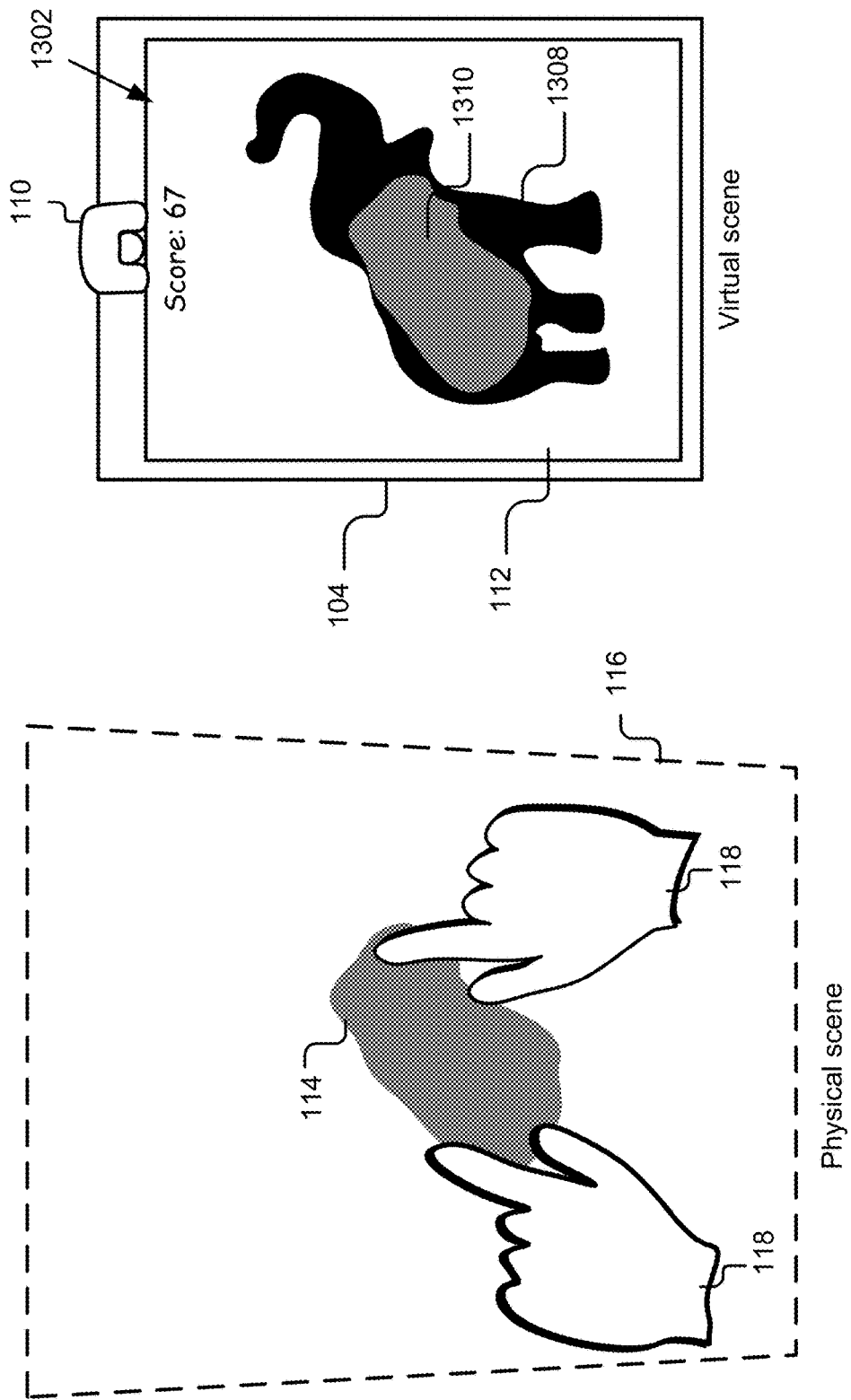
Figure 13C:
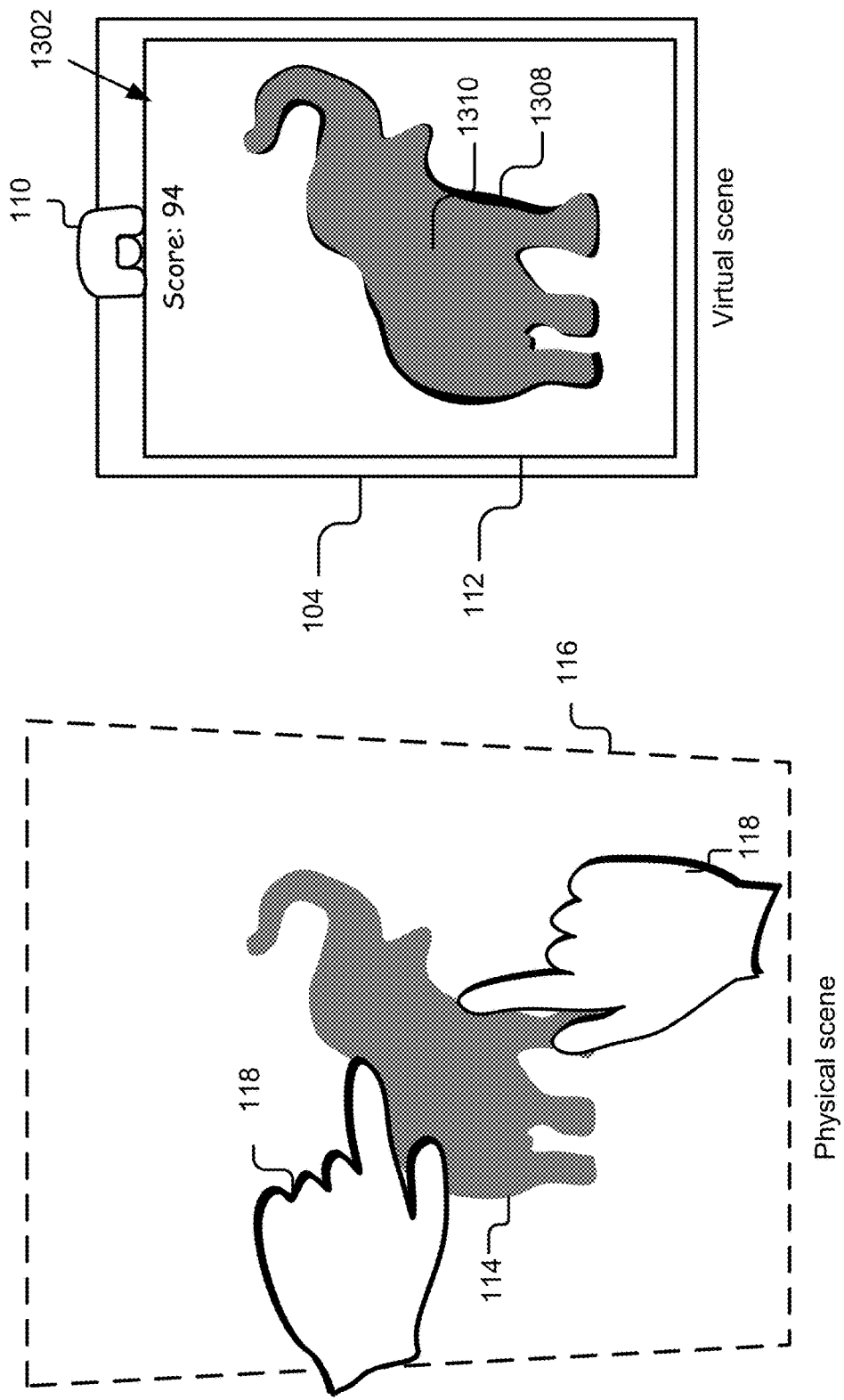

FIGS. 13A-13C depict an example modeling game in particular. In this game, the user molds tangible interface object(s) 114, moldable putty in this case (see FIG. 13B), in the physical activity scene 116 into the shape(s) 1308 depicted by the activity application 214. The detector 302 monitors the user's progress and continuously provides a description of the shape (a TI object) its attributes (which are in flux) to the activity application 214. The activity application 214 overlays the virtual representation of the elephant-shaped putty onto the elephant graphic selected by the user to show his/her progression in reproducing it. In addition to overlaying the virtualized TI object(s) (e.g., image of elephant putty) with the target virtual item(s) (e.g., the elephant), the activity application 214 may generate and display a score reflecting the user's progress (e.g., in cooperation with the scoring module 216), as discussed elsewhere herein.

By way of further example, FIG. 13A shows a beginning of the game before modeling has begun. At the outset, the activity application 214 may retrieve files embodying the items 1306 from the storage 310, generate a graphical user interface 1302 including representations of the items 1306 and the item selection element 1304 for selecting a given item (e.g., 1308), and display the graphical user interface 1302 on the device screen 112 for interaction with by the user. Using an input device 318 and the interactive elements of the graphical user interface 1302 (e.g., 1304), the user may select a given item 1308 (e.g., shape of an object) and the activity application 214 may receive input data from the input device reflecting the selection, and responsive thereto, present the corresponding item 1308 on the display of the device screen 112. In particular, FIGS. 13A-13C show the item 1308 (a virtual representation of the shape of an elephant) on the device screen 112 as being selected, although in this example the user could select a different animal or item by interacting with the left and right arrows of the selection element 1304 or returning to a home screen to select other items, browse other item categories, etc. In addition, a score of 0 means the user has not yet filled in the item 1308 with a TI object.

FIG. 13B shows in the physical scene the TI object (e.g., putty) 114 placed on the activity surface 116 and the user interacting with TI object with his/her hands 118. The interface 1302 includes a virtual representation 1310 of the TI object 114 being correspondingly represented in the virtual scene on the device screen in conjunction with the virtual item 1308. In this instance, the physical position of the TI object 114 (e.g., putty), which is detected by the detector 302, determines where the putty is positioned in the virtual scene. This physical position may reflected in the object description of the TI object, which the activity application 214 may use to place it. As shown, the contours of the green putty 1310 as virtualized fall within the contours of the virtual elephant shape 1308 being displayed on the screen.

FIG. 13B includes a score of 67. This reflects how accurately the shaping and/or positioning of the putty in the physical scene corresponds to the shape in the virtual scene. More particularly, for instance, this value represents a percentage of the total surface of the shape that has been filled by the putty and/or the amount of putty outside of the shape.

FIG. 13C shows a third iteration where the TI object 114 (e.g., physical putty) has been molded so that its contours roughly correspond to the contours of the virtual shape 1308. In this instance, the detector 302 detects and the shape of the putty using methods further described elsewhere herein. The activity application 214 renders a virtual representation 1310 of the putty on the device screen and overlays it with the target shape 1308. Additionally, the activity application 214 may calculate how accurately its contours correspond to the contours of the virtual shape. For instance, the activity application 214 calculates (e.g., in cooperation with the scoring module 216) and updates the score to 94 in the interface, which communicates to the user that the user has nearly exactly reproduced the shape of the elephant in the physical scene, as reflected in the virtual scene.

While an elephant is being used in FIGS. 13A-13C, it should be understood that any other shape or set of shapes are possible and may be used. In addition, it should be understood that moldable putty is a non-limiting example of the type of object that can be used, and that other suitable physical objects may be used (e.g., drawings, paintings, etc.). For instance, instead of or in addition to modeling putty or dough (e.g., Play-doh™), the user could draw (and the detector 302 could detect) a picture, cut pieces of paper, pile up pastas, beans, confetti, ants, etc. Virtually any object can be utilized so long as the detector 302 can detect it, as discussed elsewhere herein (e.g., separate the object from the background of the activity scene).

FIGS. 14A-14D depict another example game provided by an activity application 214 on a device screen. In the graphical user interface 1402 of this game, one or more virtual balls 1404 fall across a virtual scene and may be deflected in order to cause the balls to hit one or more targets 1406. Once one or more balls 1404, as required by the activity application 214, have hit the target(s) 1406, a new and/or updated virtual scene may be presented wherein new challenges using the same or different targets 1406 may be presented (e.g., in different locations, with different physics, new/different obstacles, etc.) as computed by the activity application 214.

Figure 14A:
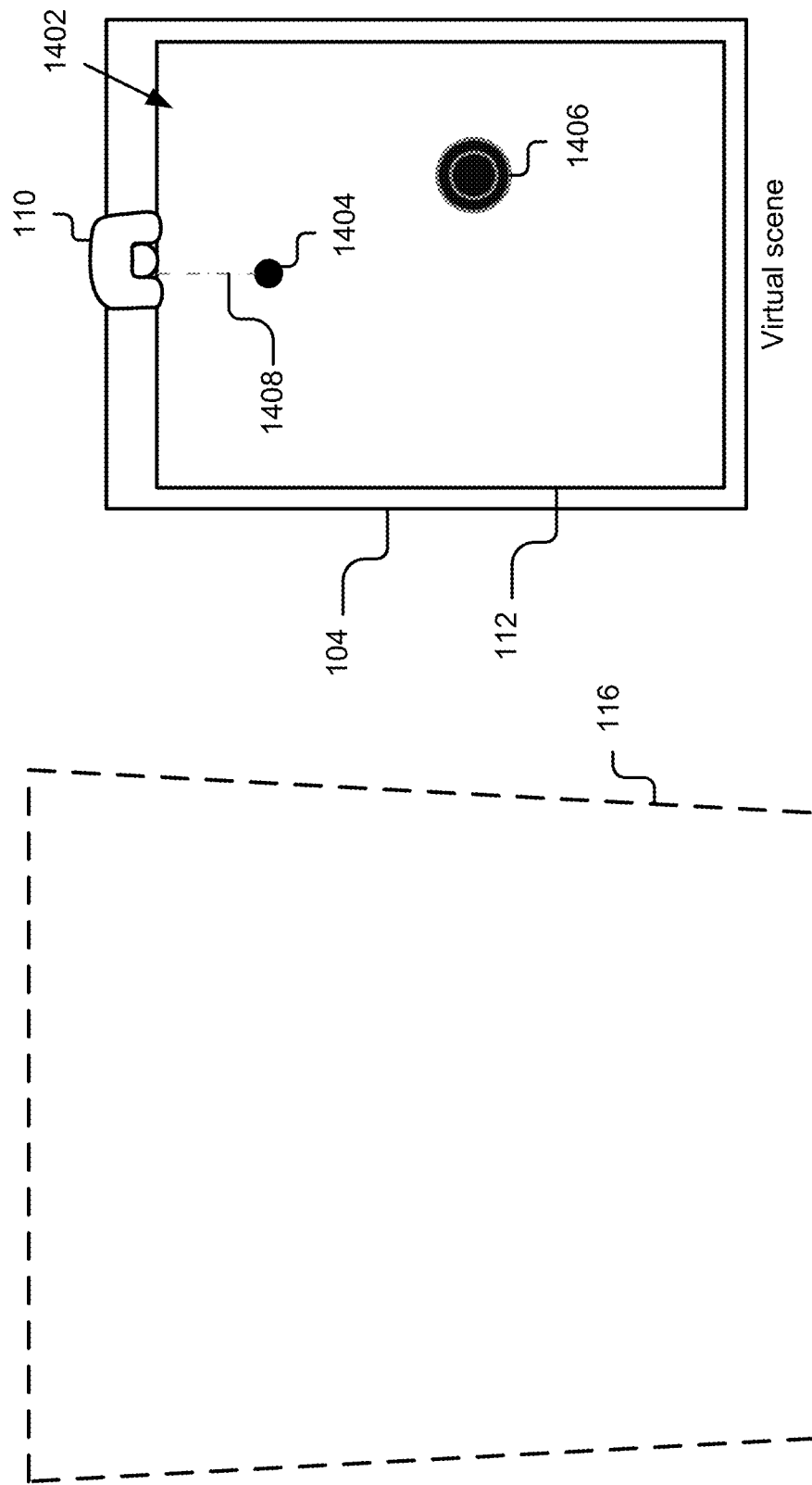

More specifically, as shown in FIG. 14A, the activity application 214 may render a target 1406 at some position in the virtual scene and may drop a ball 1404 (as reflected by the trace line 1408 which is not actually depicted on the screen to the user in this example but included in the figure for clarity) from the top of the virtual scene. The application engine may control the virtual physics governing movement of the ball and its interaction with other items within the virtual scene, such as the target and TI objects. To redirect the ball 1404, a user may place TI objects within the physical scene, and the activity application 214, in cooperation with the detection engine 212, may detect and render virtual representations of the TI objects within the virtual scene.

Figure 14B:
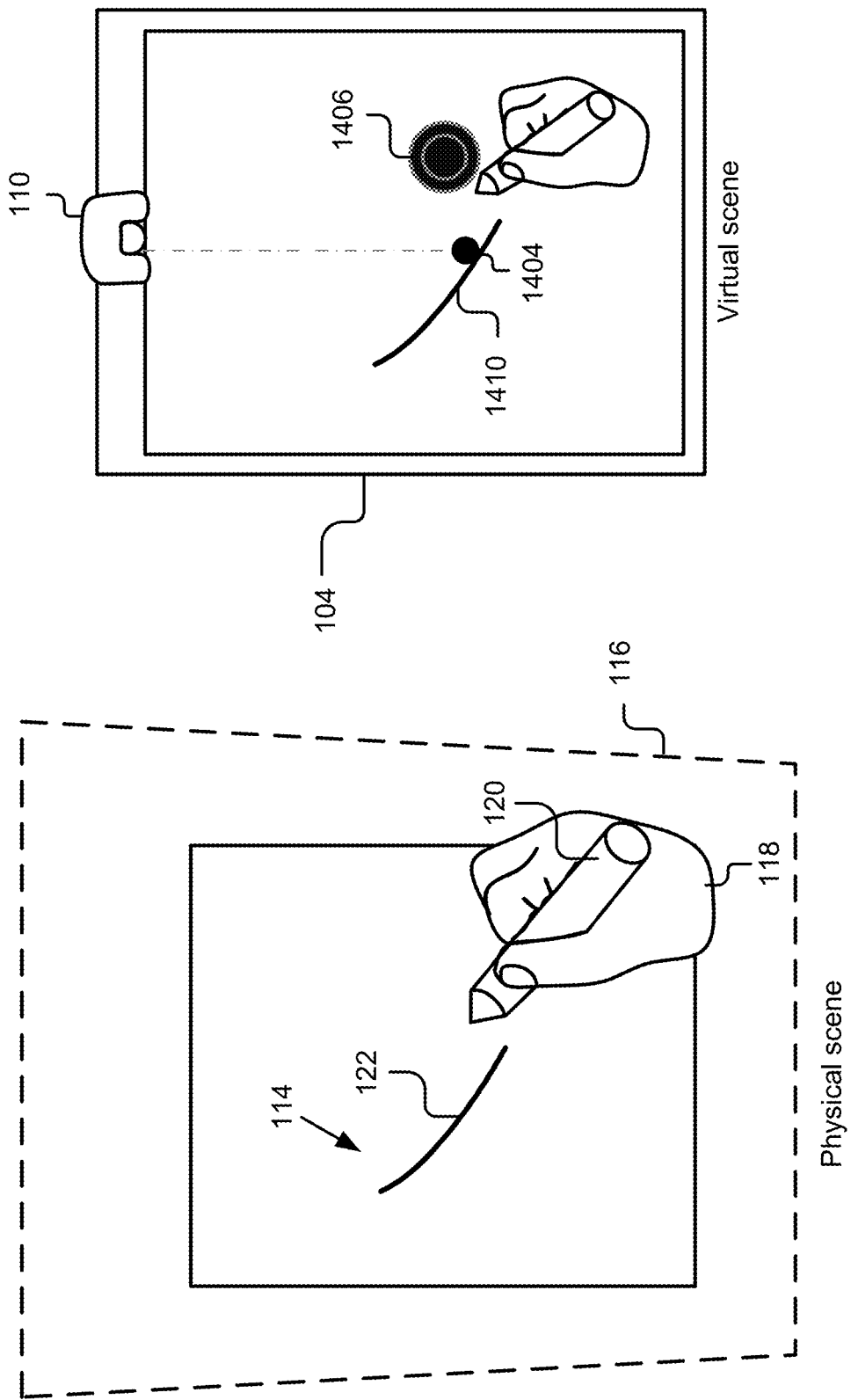
Figure 14C:
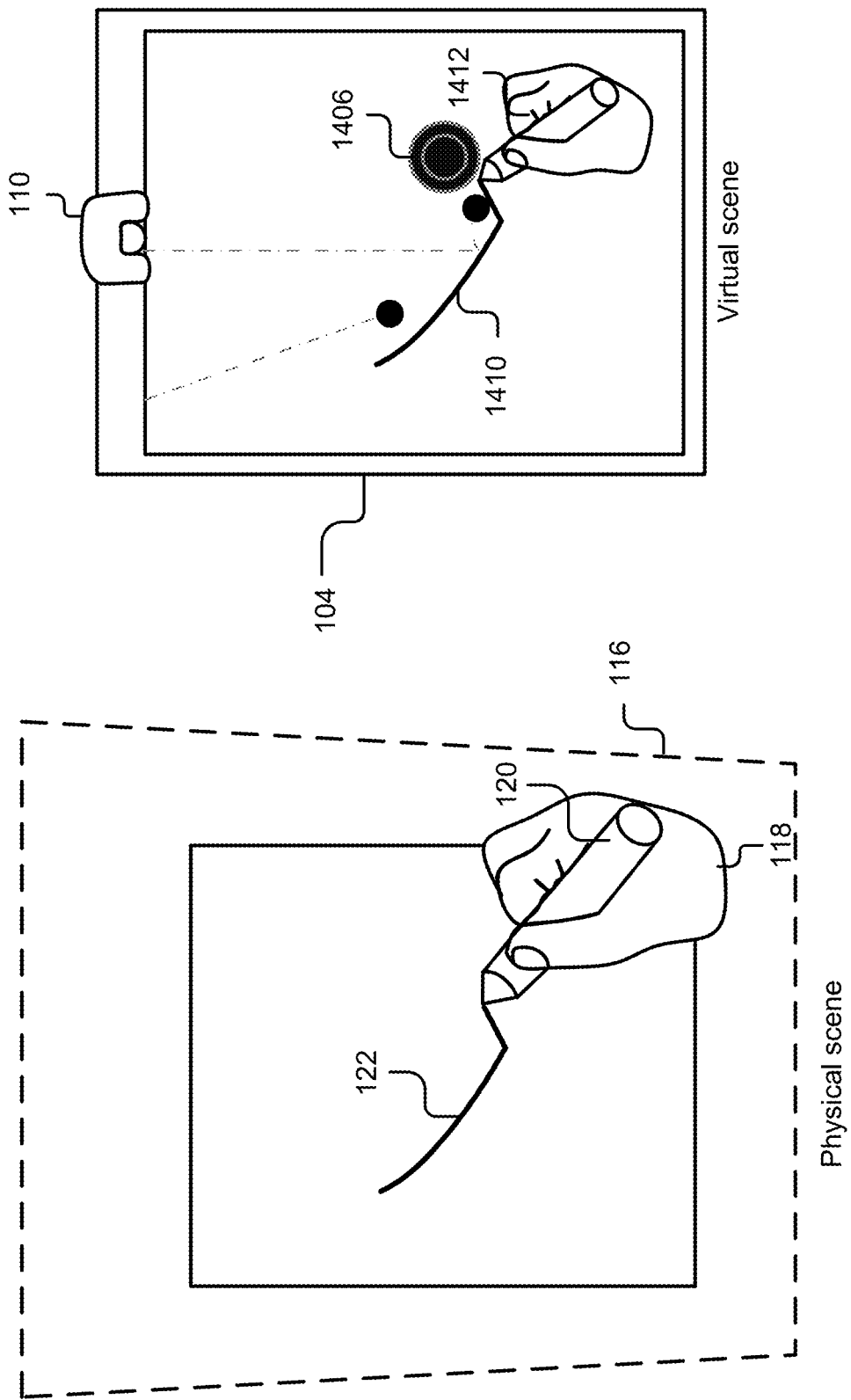

FIGS. 14B and 14C show TI object(s) introduced by the user in the activity scene (e.g., drawn by the user using drawing utensil 120) whereupon the virtual representation of the physical object 1410 may deflect the trajectory of the virtual ball(s) 1404. As shown in FIG. 14B, a user's hand 118 may draw line 122 in an activity surface (e.g., on a piece of paper) as a TI object 114, whereupon the detector 302 identifies the physical contours of the line 122 and generates corresponding representation 1410 (e.g., using the contours) that are rendered by the activity application 214 in the graphical user interface 1402. It should be understood that any object, whether known or unknown to the detector 302 (such as a user-drawn line), may be used/created by the user, and detected by the detector 302.

More particularly, as described elsewhere herein, the detector 302 may detect the line by identifying its contours. The detector 302 may also identify various attributes of the line, such as colors, contrasting colors, depth, texture, etc. The detector 302 may provide a description of the line (and its attributes) to the activity application 214, which may use it to render the virtual representation of the TI object (e.g., the line) in the activity scene and use that representation to redirect the ball(s). In some instances, the description of the line may include or be accompanies by video images of the line.

The activity application 214, having received the position of the virtual representation 1410 of the TI object 122, can use it to determine the effect on the virtual ball(s) 1404. As the activity application 214 computes the trajectory of the ball(s) 1404, it knows the position and direction of the ball(s) 1404 (e.g., in coordinates), and can compare the ball coordinates as the ball(s) 14040 move to the TI object coordinates to determine the effect of the TI object(s) on balls 1404. For example, upon hitting the line, the activity application 214 may redirect the trajectory of the ball 1404 based on the applicable physics of the activity application 214. The user may react and draw another line or extend the existing line as shown in FIG. 14C to further manipulate the trajectory of the ball(s) 1404 toward and into the target 1406.

The activity application 214 may include or omit the user's hands in/from the virtual scene depending on the applicable gameplay. The activity application 214 may identify the hand by comparing the contours of the user's hand to predetermined, stored shapes of hand and identifying it as such. In the virtual scene in FIG. 14C, for example, the activity application 214 included a virtual depiction 1412 of the user's hand, although in other variations the activity application 214 could exclude the hand from being depicted.

Figure 14D:
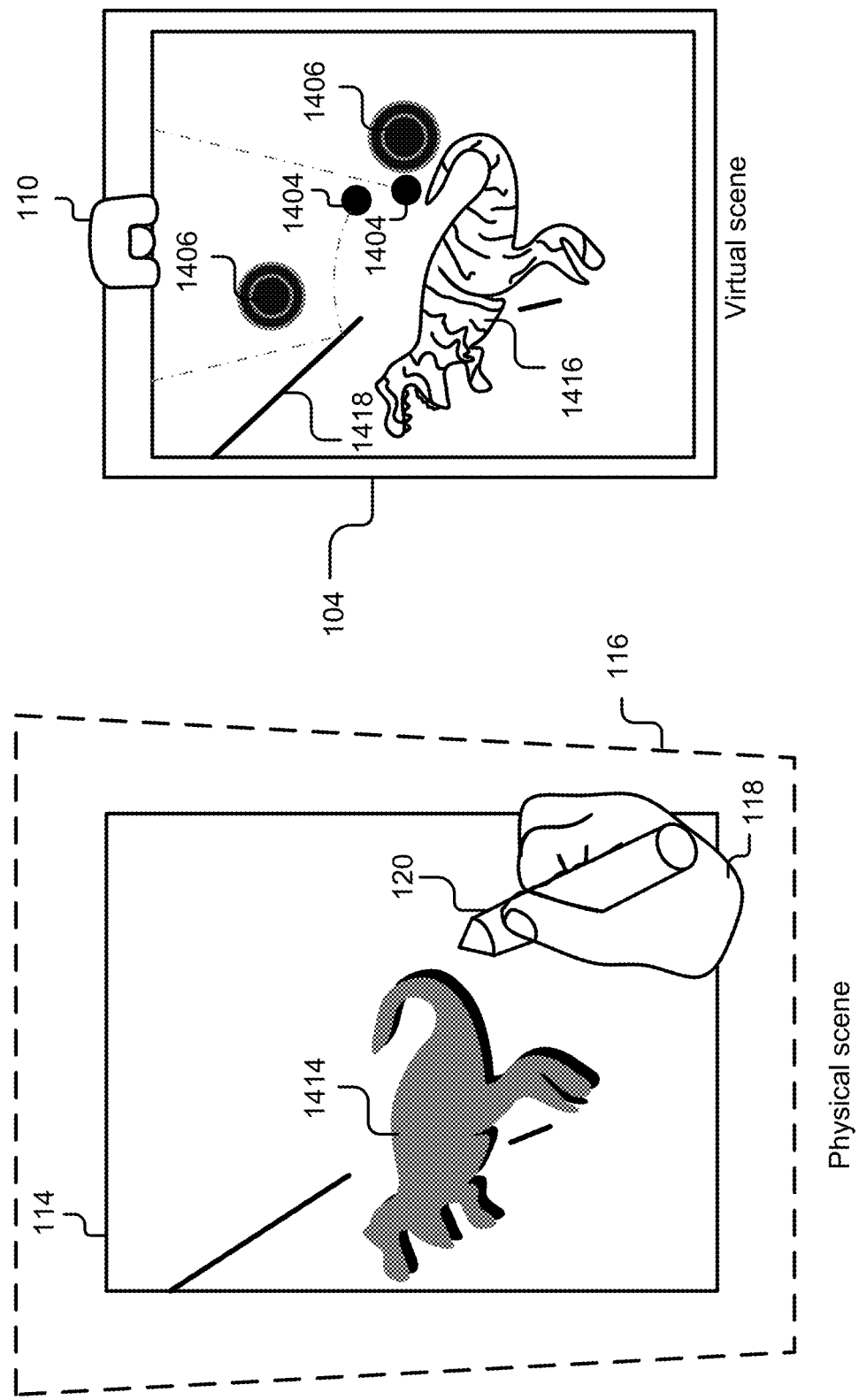

FIG. 14D shows a toy dinosaur 1414 being placed on the activity surface along with various drawn lines as discussed in reference to FIGS. 14A-14C above. As discussed elsewhere, the detector 302 may detect the physical object (e.g., dinosaur) and construct a corresponding object description based on its contours, as well as other attributes, such as colors, textures, dimensions, etc., of the physical object.

As depicted, once the detector 302 has detected the object, the activity application 214 may render a virtual representation of the object in the virtual scene using the object description received from the detector 302 and attributes (e.g., contours, colors, outlines, etc.), and use that representation to interact with and/or deflect the trajectory of the balls 1404. For instance, as shown in FIG. 14D, the virtual representation of one of the lines 1418 may defect one of the balls 1404 toward the target 1406 and the virtual representation of the dinosaur 1416 can be used to deflect the trajectory of one of the balls 1404 toward the target 1406. It should be understood that the dinosaur 1404 is merely an example embodiment and that other TI object variations are also possible.

In the above description, for purposes of explanation, numerous specific details are set forth in order to provide a thorough understanding of the present disclosure. However, it should be understood that the technology described herein can be practiced without these specific details. Further, various systems, devices, and structures are shown in block diagram form in order to avoid obscuring the description. For instance, various implementations are described as having particular hardware, software, and user interfaces. However, the present disclosure applies to any type of computing device that can receive data and commands, and to any peripheral devices providing services.

In some instances, various implementations may be presented herein in terms of algorithms and symbolic representations of operations on data bits within a computer memory. An algorithm is here, and generally, conceived to be a self-consistent set of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout this disclosure, discussions utilizing terms including "processing," "computing," "calculating," "determining," "displaying," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Various implementations described herein may relate to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, including, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

The technology described herein can take the form of hardware or software implementations, or implementations containing both hardware and software elements. For instance, the technology may be implemented in software, which includes but is not limited to firmware, resident software, microcode, etc. Furthermore, the technology can take the form of a computer program product accessible from a computer-usable or computer-readable medium providing program code for use by or in connection with a computer or any instruction execution system. For the purposes of this description, a computer-usable or computer readable medium can be any non-transitory storage apparatus that can contain, store, communicate, propagate, or transport the program for use by or in connection with the instruction execution system, apparatus, or device.

A data processing system suitable for storing and/or executing program code may include at least one processor coupled directly or indirectly to memory elements through a system bus. The memory elements can include local memory employed during actual execution of the program code, bulk storage, and cache memories that provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems, storage devices, remote printers, etc., through intervening private and/or public networks. Wireless (e.g., Wi-Fi™) transceivers, Ethernet adapters, and modems, are just a few examples of network adapters. The private and public networks may have any number of configurations and/or topologies. Data may be transmitted between these devices via the networks using a variety of different communication protocols including, for example, various Internet layer, transport layer, or application layer protocols. For example, data may be transmitted via the networks using transmission control protocol/Internet protocol (TCP/IP), user datagram protocol (UDP), transmission control protocol (TCP), hypertext transfer protocol (HTTP), secure hypertext transfer protocol (HTTPS), dynamic adaptive streaming over HTTP (DASH), real-time streaming protocol (RTSP), real-time transport protocol (RTP) and the real-time transport control protocol (RTCP), voice over Internet protocol (VOIP), file transfer protocol (FTP), WebSocket (WS), wireless access protocol (WAP), various messaging protocols (SMS, MMS, XMS, IMAP, SMTP, POP, WebDAV, etc.), or other known protocols.

Finally, the structure, algorithms, and/or interfaces presented herein are not inherently related to any particular computer or other apparatus. Various general-purpose systems may be used with programs in accordance with the teachings herein, or it may prove convenient to construct more specialized apparatus to perform the required method blocks. The required structure for a variety of these systems will appear from the description above. In addition, the specification is not described with reference to any particular programming language. It will be appreciated that a variety of programming languages may be used to implement the teachings of the specification as described herein.

The foregoing description has been presented for the purposes of illustration and description. It is not intended to be exhaustive or to limit the specification to the precise form disclosed. Many modifications and variations are possible in light of the above teaching. It is intended that the scope of the disclosure be limited not by this detailed description, but rather by the claims of this application. As will be understood by those familiar with the art, the specification may be embodied in other specific forms without departing from the spirit or essential characteristics thereof. Likewise, the particular naming and division of the modules, routines, features, attributes, methodologies and other aspects are not mandatory or significant, and the mechanisms that implement the specification or its features may have different names, divisions and/or formats.

Furthermore, the modules, routines, features, attributes, methodologies and other aspects of the disclosure can be implemented as software, hardware, firmware, or any combination of the foregoing. Also, wherever a component, an example of which is a module, of the specification is implemented as software, the component can be implemented as a standalone program, as part of a larger program, as a plurality of separate programs, as a statically or dynamically linked library, as a kernel loadable module, as a device driver, and/or in every and any other way known now or in the future. Additionally, the disclosure is in no way limited to implementation in any specific programming language, or for any specific operating system or environment. Accordingly, the disclosure is intended to be illustrative, but not limiting, of the scope of the subject matter set forth in the following claims.

What is claimed is:

1. A method comprising:
   capturing, using a video capture device, a video stream that includes an activity scene of a physical activity surface and a tangible interface object present in the activity scene;
   processing, using a processor of a computing device, the video stream for one or more contours that represent a portion of the tangible interface object;
   mapping, using the processor of the computing device, the one or more contours of the tangible interface object in a multi-dimensional space;
   generating, using the processor of the computing device, a virtual object based on the mapping of the one or more contours of the tangible interface object; and
   presenting, on a display of the computing device, the generated virtual object.

2. The method of claim 1 further comprising:
   inferring, using the processor of the computing device, a shape of the tangible interface object using the mapping of the one or more contours; and
   determining, using the processor of the computing device, a position of the tangible interface object based on the shape of the tangible interface object.

3. The method of claim 2, wherein determining the position of the tangible interface object further comprises determining an orientation of the tangible interface object in the multi-dimensional space relative to a reference point.

4. The method of claim 3, wherein the reference point is a visible portion of a stand of the computing device within a field of view of the video capture device.

5. The method of claim 1 further comprising:
   determining, using the processor of the computing device, one or more of an area, a perimeter, and a centroid of the tangible interface object using the mapping of the one or more contours; and
   calculating, using the processor of the computing device, a moment of the tangible interface object using the one or more of the determined area, the determined perimeter, and the determined centroid.

6. The method of claim 5, wherein the moment of the tangible interface object is a unique identifier of an image from the video stream that includes the one or more contours that represent the portion of the tangible interface object.

7. The method of claim 5, further comprising:
   determining, using the processor of the computing device, a color histogram of the tangible interface object based on the calculated moment of the tangible interface object; and
   transforming, using the processor of the computing device, the color histogram to enhance the one or more contours that represent the portion of the tangible interface object.

8. The method of claim 1, wherein the multi-dimensional space corresponds to dimensions of the activity scene and the mapping of the one or more contours in the multi-dimensional space corresponds to a position of the tangible interface object in the activity scene.

9. The method of claim 1, wherein mapping the one or more contours in the multi-dimensional space further comprises:
   dividing, using the processor of the computing device, an image from the video stream by overlaying a grid comprising one or more quadrants onto the image from the video stream; and
   calculating one or more color histograms for each of the one or more quadrants of the grid.

10. A physical activity surface visualization system comprising:
    a stand configured to position a computing device having one or more processors;
    a detector executable by the one or more processors to detect one or more contours that represent a portion of a tangible interface object present in an activity scene depicted in a video stream; and
    an activity application executable by the one or more processors to map the one or more contours of the tangible interface object in a multi-dimensional space, generate a virtual object based on the mapping of the one or more contours of the tangible interface object, and provide the generated virtual object for display via a display of the computing device configured to present the generated virtual object.

11. The physical activity surface visualization system of claim 10, wherein the activity application is further executable to determine a position of the tangible interface object and an orientation of the tangible interface object in the multi-dimensional space relative to a reference point.

12. The physical activity surface visualization system of claim 11, wherein the reference point is a visible portion of the stand in the video stream detectable by the detector.

13. The physical activity surface visualization system of claim 10, wherein the activity application is further configured to determine one or more of an area, a perimeter, and a centroid of the tangible interface object using the mapping of the one or more contours and calculate a moment of the tangible interface object using the one or more of the determined area, the determined perimeter, and the determined centroid.

14. The physical activity surface visualization system of claim 13, wherein the moment of the tangible interface object is a unique identifier of an image from the video stream that includes the one or more contours that represent the portion of the tangible interface object.

15. The physical activity surface visualization system of claim 13, wherein the activity application is further configured to determine a color histogram of the tangible interface object based on the calculated moment of the tangible interface object, and transform the color histogram to enhance the one or more contours that represent the portion of the tangible interface object.

16. The physical activity surface visualization system of claim 10, wherein the multi-dimensional space corresponds to dimensions of the activity scene and the mapping of the one or more contours in the multi-dimensional space corresponds to a position of the tangible interface object in the activity scene.

17. The physical activity surface visualization system of claim 10, wherein mapping the one or more contours in the multi-dimensional space further comprises:
    dividing an image from the video stream by overlaying a grid comprising one or more quadrants onto the image from the video stream; and
    calculating one or more color histograms for each of the one or more quadrants of the grid.

18. A method comprising:

capturing, using a video capture device, a video stream that includes an activity scene of a physical activity surface and a tangible interface object present in the activity scene;

processing, using a processor of a computing device, the video stream for one or more contours that represent a portion of the tangible interface object;

mapping, using the processor of the computing device, the one or more contours in a multi-dimensional space using a coordinate system;

determining, using the processor of the computing device, a position of the tangible interface object using the mapping of the one or more contours;

determining, using the processor of the computing device, a moment of the tangible interface object using the position;

generating, using the processor of the computing device, a virtual object based on the position of the tangible interface object; and presenting, on a display of the computing device, the generated virtual object.

19. The method of claim 18, further comprising:

calculating, using the processor of the computing device, a color histogram of the tangible interface object using the determined moment of the tangible interface object; and enhancing, using the processor of the computing device, the one or more contours of the tangible interface object using the calculated color histogram by adjusting a parameter of the video capture device.

20. The method of claim 19, wherein the parameter of the video capture device is one or more of a contrast, an exposure, a white balance, and a level of the video capture device.

* * * * *